(12) United States Patent
Saiwai et al.

(10) Patent No.: US 10,021,714 B2
(45) Date of Patent: Jul. 10, 2018

(54) MOBILE COMMUNICATION SYSTEM AND USER TERMINAL

(71) Applicant: KYOCERA CORPORATION, Kyoto (JP)

(72) Inventors: Takahiro Saiwai, Kawasaki (JP); Noriyoshi Fukuta, Yokohama (JP); Masato Fujishiro, Yokohama (JP); Chiharu Yamazaki, Tokyo (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/140,139

(22) Filed: Apr. 27, 2016

(65) Prior Publication Data

US 2016/0242201 A1 Aug. 18, 2016

Related U.S. Application Data

(63) Continuation of application No. 14/899,773, filed as application No. PCT/JP2014/066213 on Jun. 18, 2014.

(30) Foreign Application Priority Data

Jun. 27, 2013 (JP) .................... 2013-135605

(51) Int. Cl.
*H04W 72/12* (2009.01)
*H04W 76/14* (2018.01)
(Continued)

(52) U.S. Cl.
CPC ......... *H04W 72/1263* (2013.01); *H04W 4/70* (2018.02); *H04W 72/0446* (2013.01); *H04W 76/14* (2018.02); *H04W 92/18* (2013.01)

(58) Field of Classification Search
CPC ......... H04W 72/1263; H04W 72/0446; H04W 76/023; H04W 4/005
See application file for complete search history.

(56) References Cited

U.S. PATENT DOCUMENTS

2008/0186895 A1 8/2008 Shang et al.
2011/0255450 A1 10/2011 Wang et al.
(Continued)

FOREIGN PATENT DOCUMENTS

JP 2008-527884 A 7/2008
WO 2011/130626 A1 10/2011
(Continued)

OTHER PUBLICATIONS

International Search Report issued in PCT/JP2014/066213; dated Sep. 16, 2014.
(Continued)

*Primary Examiner* — Redentor Pasia
(74) *Attorney, Agent, or Firm* — Studebaker & Brackett PC

(57) ABSTRACT

When a UE 100-2 (a reception-side UE) that performs D2D communication by using UL radio resource switches communication modes between cellular communication and the D2D communication, if DL subframe in which data reception of the cellular communication should be performed and the UL subframe in which data reception of the D2D communication should be performed at least partially overlap on a time axis, then the UE 100-2 performs data reception in one subframe, out of the overlapping two subframes.

2 Claims, 21 Drawing Sheets

(51) Int. Cl.
*H04W 4/70* (2018.01)
*H04W 72/04* (2009.01)
*H04W 92/18* (2009.01)

(56) References Cited

U.S. PATENT DOCUMENTS

| | | | | |
|---|---|---|---|---|
| 2012/0129540 | A1* | 5/2012 | Hakola | H04W 72/042 455/450 |
| 2013/0170414 | A1* | 7/2013 | Kwon | H04W 72/042 370/311 |
| 2013/0322413 | A1* | 12/2013 | Pelletier | H04W 72/1289 370/336 |
| 2014/0094162 | A1* | 4/2014 | Heo | H04W 4/70 455/422.1 |
| 2014/0098784 | A1 | 4/2014 | Iwamura et al. | |
| 2014/0269668 | A1* | 9/2014 | Zhu | H04J 3/07 370/350 |
| 2014/0307660 | A1* | 10/2014 | Gong | H04W 72/121 370/329 |
| 2015/0049736 | A1* | 2/2015 | Liu | H04W 72/04 370/331 |
| 2015/0382365 | A1* | 12/2015 | Li | H04L 5/0085 370/329 |
| 2016/0066356 | A1* | 3/2016 | Lindoff | H04W 52/383 370/329 |

FOREIGN PATENT DOCUMENTS

| | | |
|---|---|---|
| WO | 2012/157550 A1 | 11/2012 |
| WO | 2013/048296 A1 | 4/2013 |
| WO | 2014/180517 A1 | 11/2014 |

OTHER PUBLICATIONS

Written Opinion issued in PCT/JP2014/066213; dated Sep. 16, 2014.
3GPP TR 22.803 V12.1.0 (Mar. 2013), 3rd Generation Partnership Project; Technical Specification Group Services and System Aspects; Feasibility study for Proximity Services (ProSe) (Release 12), 3GPP Organizational Partners, 2013.
3GPP TSG RAN WG1 Meeting #76bis, Shenzhen, China, Mar. 31-Apr. 4, 2014; NEC; Timing analysis for D2D transmission gap requirement; R1-141207.
3GPP TSG RAN WG1 Meeting #76, Prague, Czech Republic, Feb. 10-14, 2014; LG Electronics; D2D Discovery Signal Transmission Timing; R1-140339.
Extended European Search Report (EESR) dated Jan. 19, 2017 from corresponding EP Appl No. 14817755.3, 11 pp.
An Office Action dated Jun. 13, 2017 issued in corresponding Japanese Application No. JP 2017-042581 with concise explanation of relevance.
Extended European Search Report (EESR) dated Dec. 12, 2017, from corresponding EP Appl No. 17186679.1, 10 pp.

* cited by examiner

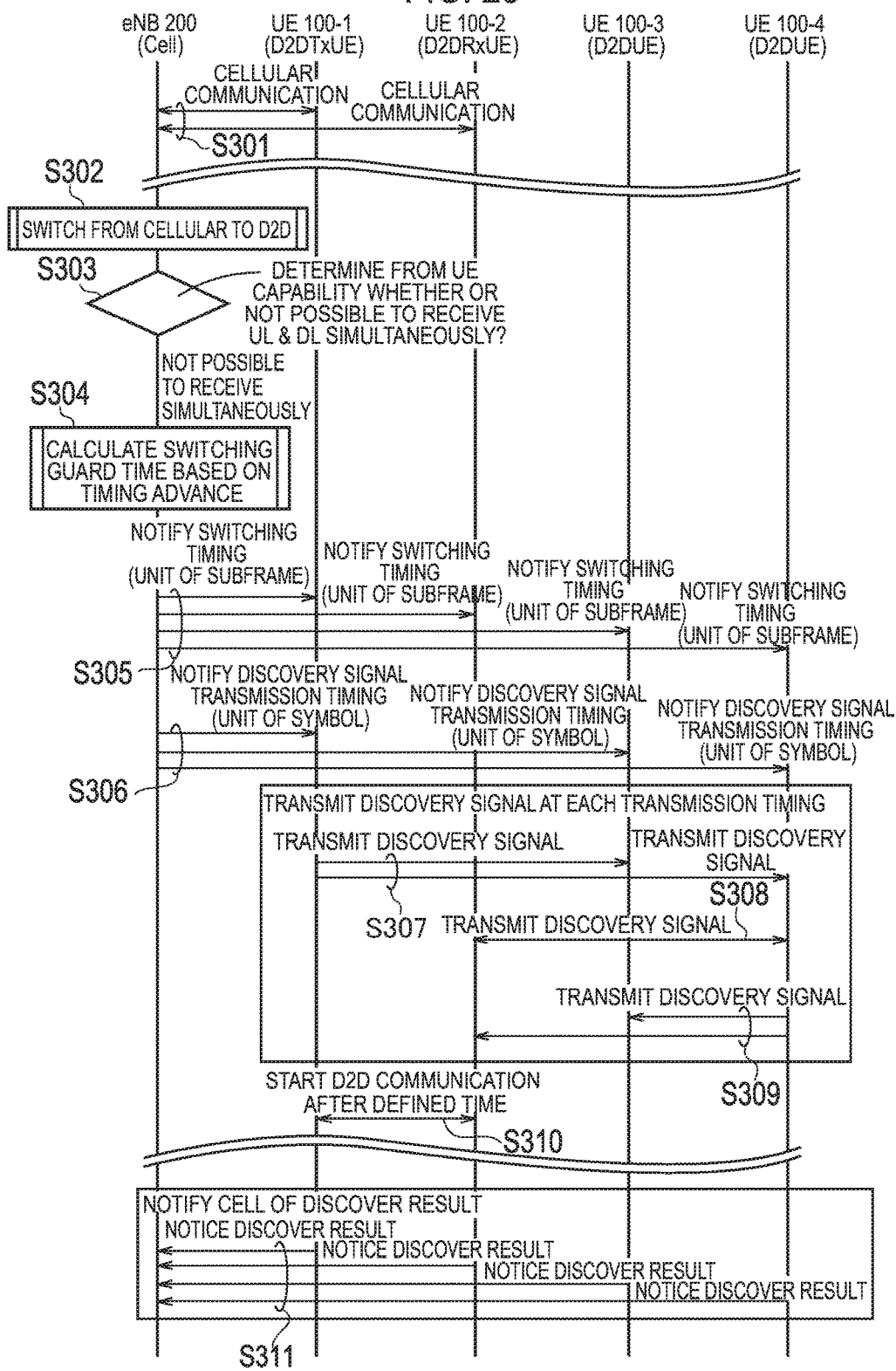

MOBILE COMMUNICATION SYSTEM AND USER TERMINAL

TECHNICAL FIELD

The present invention relates to a mobile communication system and a user terminal configured to support D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of adjacent user terminals perform direct device-to-device communication without passing through a core network. On the other hand, a data path of normal communication (cellular communication) of a mobile communication system passes through the core network.

In the D2D communication, it is supposed that an uplink radio resource or a downlink radio resource of cellular communication is used. The uplink radio resource includes a plurality of uplink subframes divided on a time axis. The downlink radio resource includes a plurality of downlink subframes divided on a time axis.

PRIOR ART DOCUMENT

Non-Patent Document

Non Patent Document 1:3GPP technical report "TR 22.803 V12.1.0" March, 2013

SUMMARY OF THE INVENTION

In cellular communication, it is common that because of a propagation delay between a user terminal and a base station and control to compensate for the delay, for example, an uplink subframe and a downlink subframe handled by the user terminal are inconsistent on a time axis.

Accordingly, in a case where the uplink radio resource is used for D2D communication, when communication modes are switched between the cellular communication and the D2D communication, a situation may occur that the downlink subframe in which data reception of the cellular communication should be performed and the uplink subframe in which data reception of the D2D communication should be performed at least partially overlap on a time axis (that is, simultaneous reception of cellular and D2D).

Here, the user terminal does not necessarily have a capability to perform simultaneous reception of cellular and D2D. Alternatively, even in a case that the user terminal has the capability to perform the simultaneous reception of cellular and D2D, if the simultaneous reception of cellular and D2D is performed, then a communication quality deteriorates due to interference.

Therefore, to resolve such a problem, when the communication modes are switched between the cellular communication and the D2D communication, in a case that the downlink subframe in which the data reception of the cellular communication should be performed and the uplink subframe in which the data reception of the D2D communication should be performed overlap on a time axis, a method may be considered where the both of the overlapping two subframes are not used.

However, in such a method, there is a problem that it is not possible to effectively use a radio resource because the radio resource by the two subframes are useless.

On the other hand, in a case where the downlink radio resource is used for the D2D communication, when the communication modes are switched between the cellular communication and the D2D communication, a situation may occur that the uplink subframe in which the data transmission of the cellular communication should be performed and the downlink subframe in which the data transmission of the D2D communication should be performed at least partially overlap on a time axis (that is, simultaneous transmission of cellular and D2D).

Therefore, in a case where the downlink radio resource is used for the D2D communication, a problem occurs similarly to the case where the uplink radio resource is used for the D2D communication.

Therefore, an object of the present invention is to provide a mobile communication system and a user terminal with which it is possible to effectively utilize a radio resource when communication modes are switched between cellular communication and D2D communication and to avoid simultaneous reception of cellular and D2D or simultaneous transmission of cellular and D2D.

In a mobile communication system according to a first aspect, an uplink radio resource of cellular communication includes a plurality of uplink subframes divided on a time axis and a downlink radio resource of the cellular communication includes a plurality of downlink subframes divided on a time axis. The mobile communication system comprises: a user terminal that performs D2D communication that is direct device-to-device communication by using the uplink radio resource. When the user terminal switches communication modes between the cellular communication and the D2D communication, if the downlink subframe in which data reception of the cellular communication should be performed and the uplink subframe in which data reception of the D2D communication should be performed at least partially overlap on a time axis, then the user terminal performs data reception in one subframe, out of the overlapping two subframes.

In a mobile communication system according to a second aspect, an uplink radio resource of cellular communication includes a plurality of uplink subframes divided on a time axis and a downlink radio resource of the cellular communication includes a plurality of downlink subframes divided on a time axis. The mobile communication system comprises: a user terminal configured to perform D2D communication that is direct device-to-device communication by using the downlink radio resource. When the user terminal switches communication modes between the cellular communication and the D2D communication, if the uplink subframe in which data transmission of the cellular communication should be performed and the downlink subframe in which data transmission of the D2D communication should be performed at least partially overlap on a time axis, the user terminal performs the data transmission in one subframe, out of the overlapping two subframes.

A user terminal according to a third aspect is configured to perform D2D communication that is direct device-to-device communication by using an uplink radio resource in a mobile communication system in which the uplink radio resource of cellular communication includes a plurality of uplink subframes divided on a time axis, and a downlink radio resource of the cellular communication includes a plurality of downlink subframes divided on a time axis. The user terminal comprises: a controller configured to perform, when communication modes are switched between the cellular communication and the D2D communication, if the downlink subframe in which data reception of the cellular communication should be performed and the uplink subframe in which data reception of the D2D communication should be performed at least partially overlap on a time axis, data reception in one subframe, out of the overlapping two subframes.

A user terminal according to a fourth aspect is configured to perform D2D communication that is direct device-to-device communication by using a downlink radio resource in a mobile communication system in which an uplink radio resource of cellular communication includes a plurality of uplink subframes divided on a time axis and the downlink radio resource of the cellular communication includes a plurality of downlink subframes divided on a time axis. The user terminal comprises: a controller configured to perform, when communication modes are switched between the cellular communication and the D2D communication, if the uplink subframe in which data transmission of the cellular communication should be performed and the downlink subframe in which data transmission of the D2D communication should be performed at least partially overlap on a time axis, a data transmission in one subframe, out of the overlapping two subframes.

BRIEF DESCRIPTION OF THE DRAWINGS

FIG. 23 is a sequence diagram showing the switching operation from the cellular communication to the D2D communication in a case of performing the D2D communication by using a UL radio resource, in the third embodiment.

DESCRIPTION OF THE EMBODIMENT

Overview of Embodiment

Figure 1:
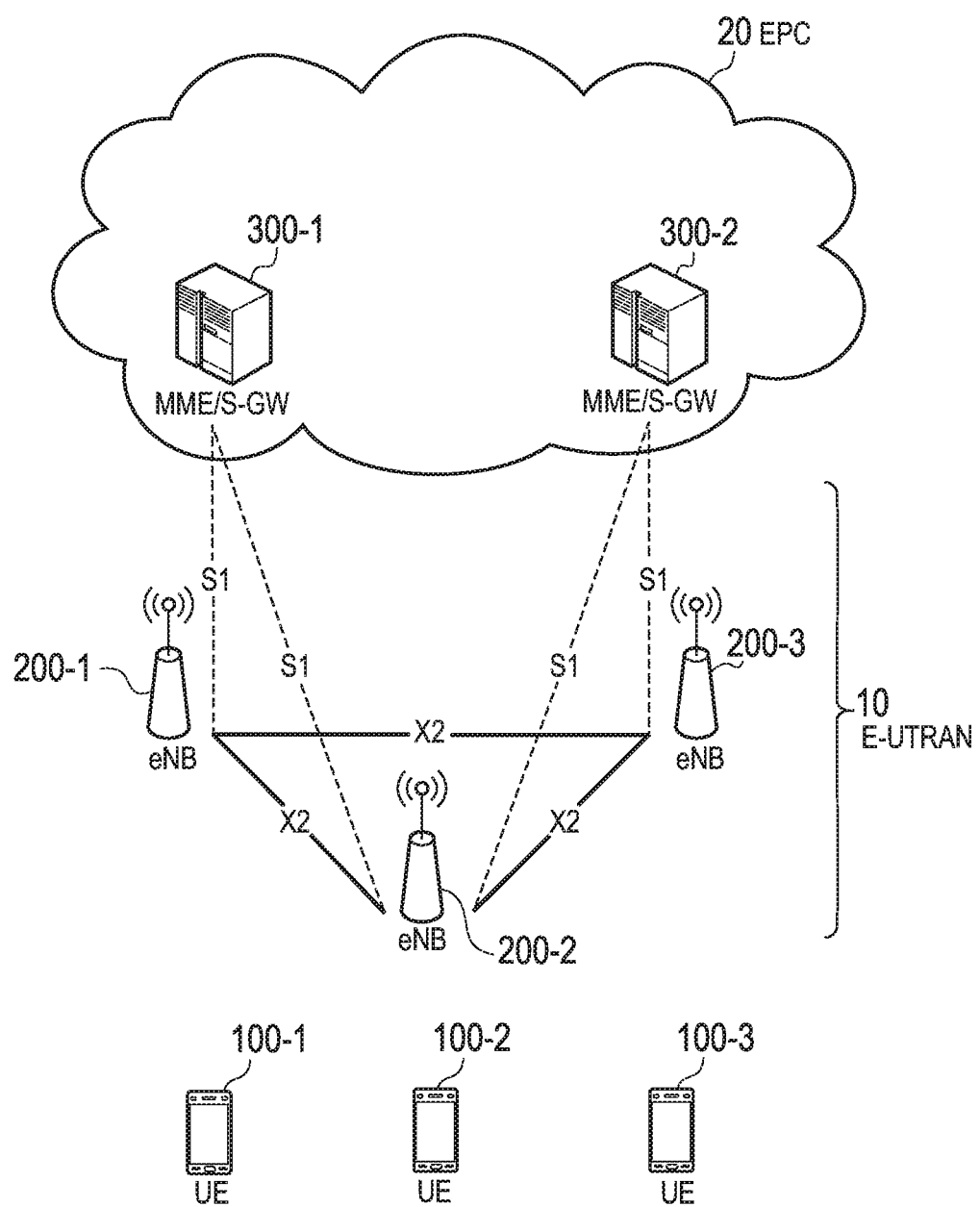
FIG. 1 is a configuration diagram of an LTE system according to a first embodiment to a third embodiment.

In a mobile communication system according to a first embodiment to a third embodiment, an uplink radio resource of cellular communication includes a plurality of uplink subframes divided on a time axis and a downlink radio resource of the cellular communication includes a plurality of downlink subframes divided on a time axis. The mobile communication system comprises: a user terminal that performs D2D communication that is direct device-to-device communication by using the uplink radio resource. When the user terminal switches communication modes between the cellular communication and the D2D communication, if the downlink subframe in which data reception of the cellular communication should be performed and the uplink subframe in which data reception of the D2D communication should be performed at least partially overlap on a time axis, then the user terminal performs data reception in one subframe, out of the overlapping two subframes.

In a first embodiment, the mobile communication system further comprises: a base station configured to assign a radio resource to the user terminal. When the user terminal switches communication modes between the cellular communication and the D2D communication, if the downlink subframe in which data reception of the cellular communication should be performed and the uplink subframe in which data reception of the D2D communication should be performed at least partially overlap on a time axis, the base station assigns the radio resource corresponding to the one subframe, to the user terminal, and assigns the radio resource corresponding to the other subframe, out of the overlapping two subframes, to a user terminal other than the user terminal.

In a second embodiment, the other subframe, out of the overlapping two subframes, includes a non-overlapping interval not overlapping, on a time axis, the one subframe. The user terminal further performs data reception in the non-overlapping interval included in the other subframe.

In a second embodiment, the mobile communication system further comprises: a base station configured to assign a radio resource to the user terminal. When the user terminal switches communication modes between the cellular communication and the D2D communication, if the downlink subframe in which data reception of the cellular communication should be performed and the uplink subframe in which data reception of the D2D communication should be performed at least partially overlap on a time axis, then the base station assigns the radio resource corresponding to the one subframe, to the user terminal, and assigns the radio resource corresponding to the non-overlapping interval included in the other subframe, to the user terminal.

In a third embodiment, the other subframe, out of the overlapping two subframes, includes a non-overlapping interval not overlapping, on a time axis, the one subframe. The user terminal performs a discovery process of the D2D communication in the non-overlapping interval included in the other subframe.

In a third embodiment, the mobile communication system further comprises: a base station configured to assign a radio resource to the user terminal. When the user terminal switches communication modes between the cellular communication and the D2D communication, if the downlink subframe in which data reception of the cellular communication should be performed and the uplink subframe in which data reception of the D2D communication should be performed at least partially overlap on a time axis, then the base station assigns the radio resource corresponding to the one subframe, to the user terminal, and assigns the radio resource corresponding to the non-overlapping interval included in the other subframe, to the user terminal for the discovery process.

In a mobile communication system a first embodiment to a third embodiment, an uplink radio resource of cellular communication includes a plurality of uplink subframes divided on a time axis and a downlink radio resource of the cellular communication includes a plurality of downlink subframes divided on a time axis. The mobile communication system comprises: a user terminal configured to perform D2D communication that is direct device-to-device communication by using the downlink radio resource. When the user terminal switches communication modes between the cellular communication and the D2D communication, if the uplink subframe in which data transmission of the cellular communication should be performed and the downlink subframe in which data transmission of the D2D communication should be performed at least partially overlap on a time axis, the user terminal performs the data transmission in one subframe, out of the overlapping two subframes.

In a first embodiment, the mobile communication system further comprises: a base station configured to assign the radio resource to the user terminal. When the user terminal switches communication modes between the cellular communication and the D2D communication, if the uplink subframe in which data transmission of the cellular communication should be performed and the downlink subframe in which data transmission of the D2D communication should be performed at least partially overlap on a time axis, then the base station assigns the radio resource corresponding to the one subframe, to the user terminal, and assigns the radio resource corresponding to the other subframe, out of the overlapping two subframes, a user terminal other than the user terminal.

In a second embodiment, the other subframe, out of the overlapping two subframes, includes a non-overlapping interval not overlapping, on a time axis, the one subframe. The user terminal further performs a data transmission in the non-overlapping interval included in the other subframe.

In a second embodiment, the mobile communication system further comprises: a base station configured to assign the radio resource to the user terminal. When the user terminal switches communication modes between the cellular communication and the D2D communication, if the uplink subframe in which data transmission of the cellular communication should be performed and the downlink subframe in which data transmission of the D2D communication should be performed at least partially overlap on a time axis, then the base station assigns the radio resource corresponding to the one subframe, to the user terminal, and assigns the radio resource corresponding to the non-overlapping interval included in the other subframe, to the user terminal.

In a third embodiment, the other subframe, out of the overlapping two subframes, includes a non-overlapping interval not overlapping, on a time axis, the one subframe. The user terminal performs a discovery process of the D2D communication in the non-overlapping interval included in the other subframe.

In a third embodiment, the mobile communication system according to claim 11, further comprising: a base station configured to assign a radio resource to the user terminal. When the user terminal switches communication modes between the cellular communication and the D2D communication, if the uplink subframe in which data transmission of the cellular communication should be performed and the downlink subframe in which data transmission of the D2D communication should be performed at least partially overlap on a time axis, then the base station assigns the radio resource corresponding to the one subframe, to the user terminal, and assigns the radio resource corresponding to the non-overlapping interval included in the other subframe, to the user terminal for the discovery process.

A user terminal according to a first embodiment to a third embodiment is configured to perform D2D communication that is direct device-to-device communication by using an uplink radio resource in a mobile communication system in which the uplink radio resource of cellular communication includes a plurality of uplink subframes divided on a time axis, and a downlink radio resource of the cellular communication includes a plurality of downlink subframes divided on a time axis. The user terminal comprises: a controller configured to perform, when communication modes are switched between the cellular communication and the D2D communication, if the downlink subframe in which data reception of the cellular communication should be performed and the uplink subframe in which data reception of the D2D communication should be performed at least partially overlap on a time axis, data reception in one subframe, out of the overlapping two subframes.

A user terminal according to a first embodiment to a third embodiment is configured to perform D2D communication that is direct device-to-device communication by using a downlink radio resource in a mobile communication system in which an uplink radio resource of cellular communication includes a plurality of uplink subframes divided on a time axis and the downlink radio resource of the cellular communication includes a plurality of downlink subframes divided on a time axis. The user terminal comprises: a controller configured to perform, when communication modes are switched between the cellular communication and the D2D communication, if the uplink subframe in which data transmission of the cellular communication should be performed and the downlink subframe in which data transmission of the D2D communication should be performed at least partially overlap on a time axis, a data transmission in one subframe, out of the overlapping two subframes.

First Embodiment

Hereinafter, a description will be provided for an embodiment in a case where the present invention is applied to an LTE system.

(System Configuration)

FIG. 1 is a configuration diagram of an LTE system according to the first embodiment. As illustrated in FIG. 1, the LTE system includes UEs (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a connecting cell (serving cell). A configuration of the UE 100 will be described below in detail.

The E-UTRAN 10 corresponds to a radio access network. The E-UTRAN 10 includes eNBs 200 (evolved Node-B). The eNB 200 corresponds to a base station. The eNBs 200 are connected to one another via an X2 interface. A configuration of the eNB 200 will be described below in detail.

Each eNB 200 manages one or a plurality of cells and performs radio communication with the UE 100 which establishes a connection with the cell of the eNB 200. The eNB 200, for example, has a radio resource management (RRM) function, a routing function of user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. The E-UTRAN 10 and the EPC 20 configure a network of the LTE system. The EPC 20 includes a plurality of MME (Mobility Management Entity)/S-GWs (Serving-Gateway) 300. The MME performs various mobility controls and the like for the UE 100. The S-GW performs transfer control of user data. The MME/S-GW 300 is connected to the eNBs 200 via an S1 interface.

Figure 2:
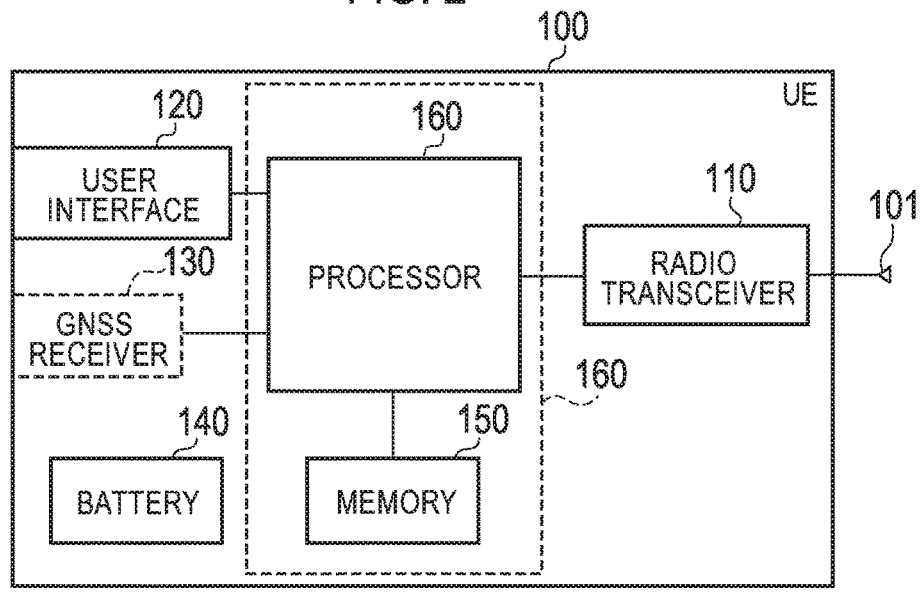
FIG. 2 is a block diagram of UE according to the first embodiment to the third embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (transmission signal) output from the processor 160 into the radio signal, and transmits the radio signal from the plurality of antennas 101. Furthermore, the radio transceiver 110 converts the radio signal received by the plurality of antennas 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols, which will be described later.

Figure 3:
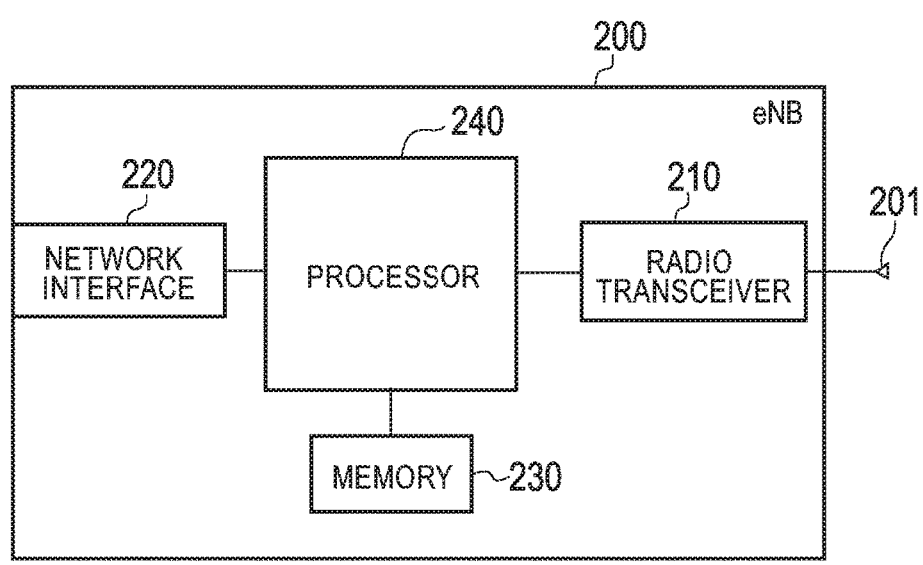
FIG. 3 is a block diagram of eNB according to the first embodiment to the third embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The radio transceiver 210 converts a baseband signal (transmission signal) output from the processor 240 into the radio signal, and transmits the radio signal from the plurality of antennas 201. Furthermore, the radio transceiver 210 converts the radio signal received by the plurality of antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols, which will be described later.

Figure 4:
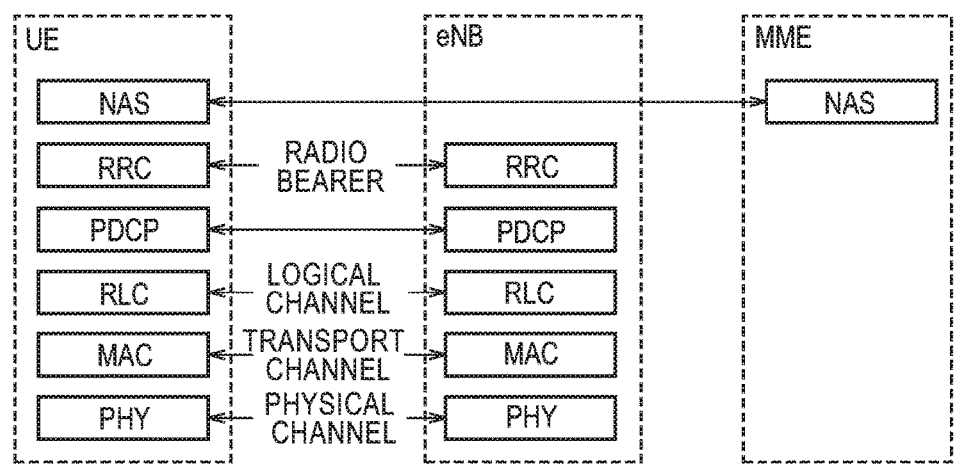
FIG. 4 is a protocol stack diagram of a radio interface according to the first embodiment to the third embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes an MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a transport format of an uplink and a downlink (a transport block size and a modulation and coding scheme) and a scheduler for determining a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is an connection (RRC connection) between the RRC of the UE 100 and the RRC of the eNB 200, the UE 100 is in a connected state (an RRC connected state), and when there is no connection (no RRC connection), the UE 100 is in an idle state (an RRC idle state).

An NAS (Non-Access Stratum) layer positioned above the RRC layer performs session management, mobility management and the like.

Figure 5:
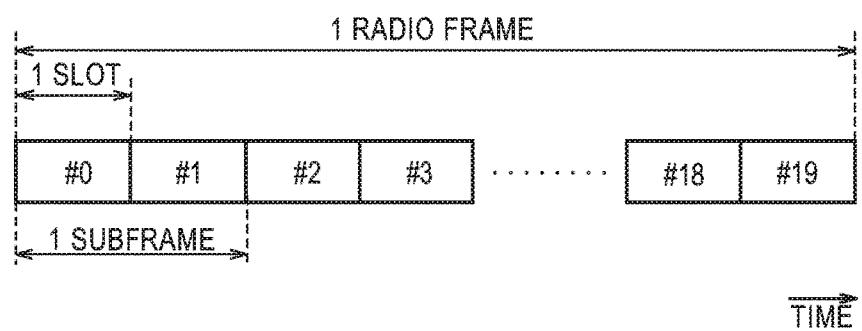
FIG. 5 is a configuration diagram of a radio frame according to the first embodiment to the third embodiment.

FIG. 5 is a configuration diagram of a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. Each resource block includes a plurality of subcarriers in the frequency direction. A radio resource unit is configured by one subcarrier and one symbol and one subcarrier.

Among radio resources allocated to the UE 100, a frequency resource can be configured by a resource block and a time resource can be configured by a subframe (or slot).

In the DL, an interval of several symbols from the head of each subframe is a region used as a physical downlink control channel (PDCCH) for mainly transmitting a control signal. Furthermore, the other portion of each subframe is a region available as a physical downlink shared channel (PDSCH) for mainly transmitting user data.

In the UL, both ends in the frequency direction of each subframe are regions used as a physical uplink control channel (PUCCH) for mainly transmitting a control signal. The central portion of each subframe is a region available as a physical uplink shared channel (PUSCH) for mainly transmitting user data.

(Operation According to First Embodiment)

An LTE system according to the first embodiment supports D2D communication that is direct device-to-device communication (UE-to-UE communication). Here, the D2D communication is described in comparison with cellular communication that is normal communication of the LTE system. The cellular communication is a communication mode in which a data path passes through a network (E-UTRAN 10, EPC 20). The data path is a communication path for user data. On the other hand, the D2D communication is a communication mode in which a data path set between UEs does not pass through the network.

Figure 6:
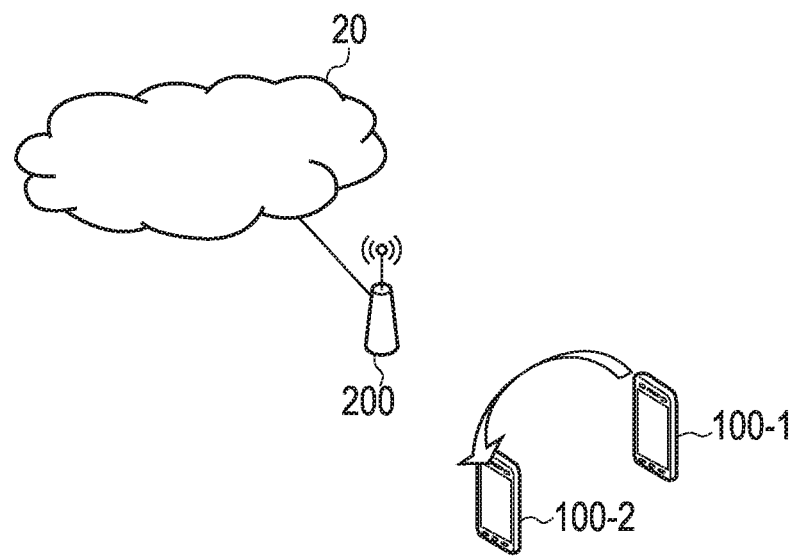
FIG. 6 is a diagram for describing D2D communication according to the first embodiment to the third embodiment.

FIG. 6 is a diagram for describing the D2D communication.

As shown in FIG. 6, in the D2D communication, a data path does not pass through the eNB 200. A UE 100-1 and a UE 100-2 adjacent to each other directly perform radio communication with low transmission power in a cell of the eNB 200. The UE 100-1 is a transmission-side UE configured to perform transmission of user data (hereinafter, simply called "data transmission"). The UE 100-2 is a reception-side UE configured to receive user data (hereinafter, simply called "data reception").

Thus, when the adjacent UE 100-1 and UE 100-2 directly perform radio communication with low transmission power, it is possible to reduce a power consumption of the UE 100 and to reduce interference to a neighbouring cell, in comparison with in the cellular communication. In the D2D communication, it is supposed that a UL radio resource (UL bandwidth) or a DL radio resource (DL bandwidth) of the cellular communication is used. The UL radio resource includes a plurality of UL subframes divided on a time axis. The DL radio resource includes a plurality of DL subframes divided on a time axis.

Below, an operation according to the first embodiment will be described in order of (1) a case of performing the D2D communication by using the UL radio resource, and (2) a case of performing the D2D communication by using the DL radio resource.

(1) Case of Performing D2D Communication by Using UL Radio Resource

In the cellular communication, it is common that because of a propagation delay between the UE 100 and the eNB 200 and control to compensate for the delay, for example, the UL subframe and the DL subframe handled by the UE 100 are inconsistent on a time axis. Thus, in a case of using the UL radio resource for the D2D communication, when communication modes are switched between the cellular communication and the D2D communication, a situation may occur that the DL subframe in which data reception of the cellular communication should be performed and the UL subframe in which data reception of the D2D communication should be performed overlap (that is, simultaneous reception of cellular and D2D) at least partially on a time axis. The UE 100 does not necessarily have a capability to perform the simultaneous reception of cellular and D2D. Alternatively, even in a case that the user terminal has the capability to perform the simultaneous reception of cellular and D2D, if the simultaneous reception of cellular and D2D is performed, then a communication quality deteriorates due to interference.

Therefore, in the first embodiment, when the communication modes are switched between the cellular communication and the D2D communication, in a case that the DL subframe in which the data reception of the cellular communication should be performed and the UL subframe in which the data reception of the D2D communication should be performed overlap at least partially on a time axis, the UE 100-2 (reception-side UE) configured to perform the D2D communication by using the UL radio resource performs the data reception in one subframe, out of the overlapping two subframes.

Further, when the UE 100-2 switches the communication modes between the cellular communication and the D2D communication, in a case that the DL subframe in which the data reception of the cellular communication should be performed and the UL subframe in which the data reception of the D2D communication should be performed overlap at least partially on a time axis, the eNB 200 configured to assign the radio resource to the UE 100-2 assigns the radio resource corresponding to one subframe, to the UE 100-2, and assigns the radio resource corresponding to the other subframe, out of the overlapping two subframes, to the UE 100 (UE 100-X) other than the UE 100-2.

Therefore, in a case of performing the D2D communication by using the UL radio resource, when the communication modes are switched between the cellular communication and the D2D communication, it is possible to effectively utilize the radio resource and avoid the simultaneous reception of cellular and D2D.

Below, a case of performing the D2D communication by using the UL radio resource will be described in order of (1.1) a switching operation from the cellular communication to the D2D communication, and (1.2) a switching operation from the D2D communication to the cellular communication.

(1.1) Switching Operation from Cellular Communication to D2D Communication

Figure 7:
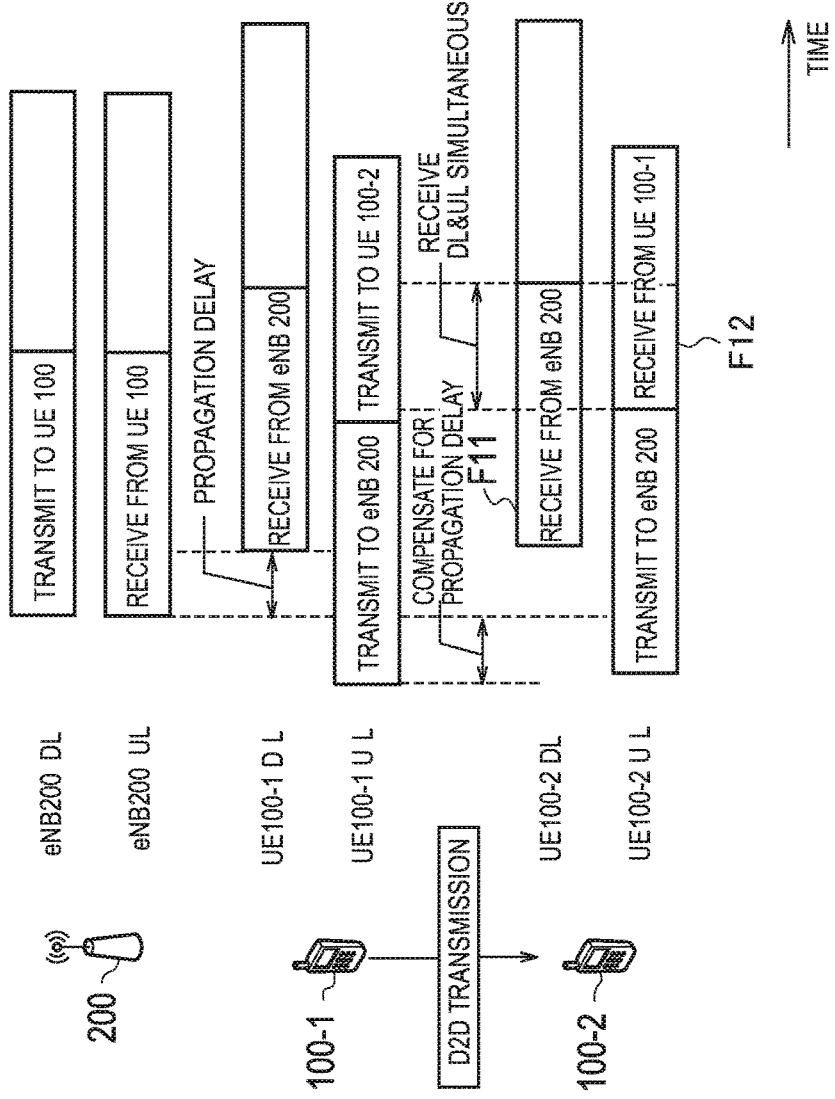
FIG. 7 is a diagram for describing a switching operation from cellular communication to D2D communication in a case of performing D2D communication by using a UL radio resource, in the first embodiment.
Figure 8:
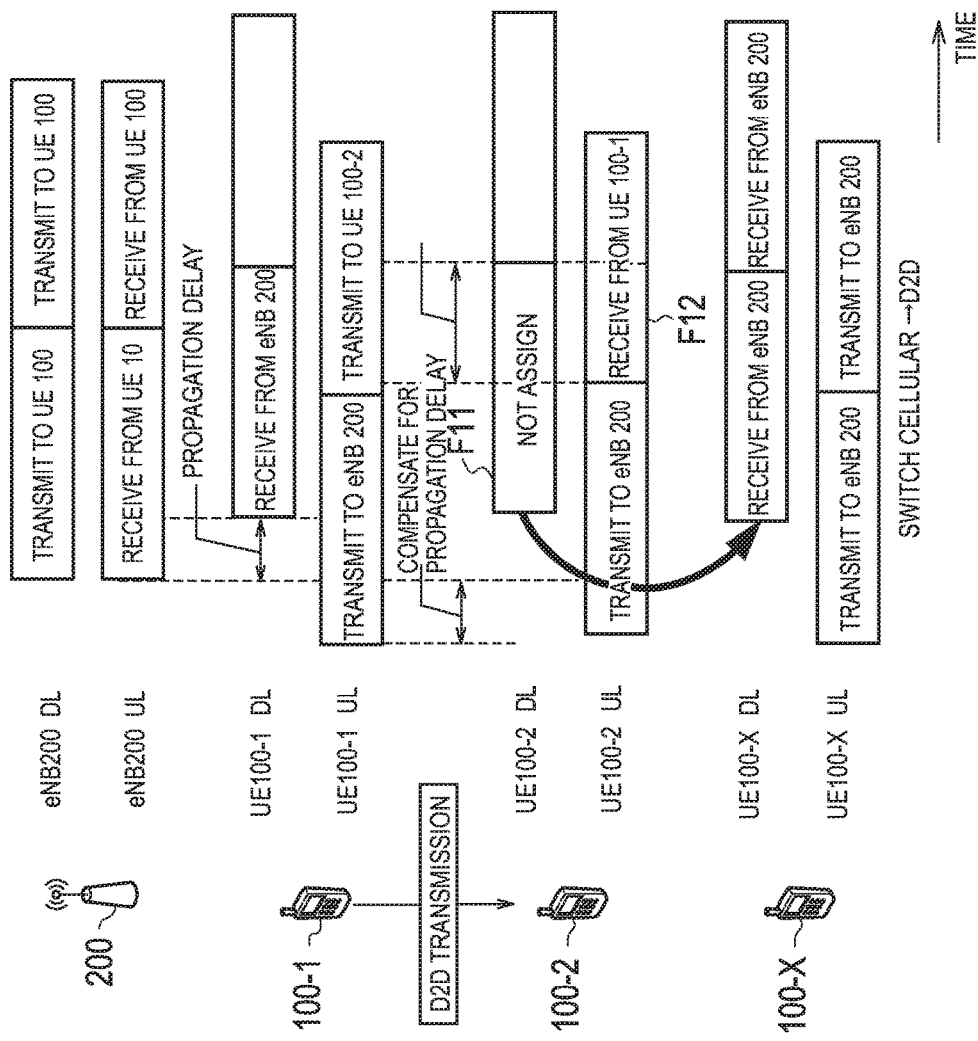
FIG. 8 is a diagram for describing the switching operation from the cellular communication to the D2D communication in a case of performing the D2D communication by using the UL radio resource, in the first embodiment.

FIG. 7 and FIG. 8 are diagrams for describing the switching operation from the cellular communication to the D2D communication.

As shown in FIG. 7, in an initial state, each of the UE 100-1 and the UE 100-2 performs the cellular communication (the UL communication and the DL communication) in the cell of the eNB 200. Here, an operation environment is supposed where the UE 100-1 and the UE 100-2 are located far from the eNB 200.

In the DL communication, when a delay time passes by a propagation delay after the eNB 200 transmits the user data, the UE 100-1 and the UE 100-2 receive the user data. Thus, the DL subframe in the UE 100-1 and the UE 100-2 is located, on a time axis, after the DL subframe in the eNB 200.

On the other hand, in the UL communication, control to compensate for the propagation delay is applied. Specifically, the eNB 200 transmits a timing advance value for adjusting a transmission timing to each of the UE 100-1 and the UE 100-2. To the timing advance value, a value indicating an adjustment amount to the present transmission timing is set so that a reception timing in the eNB 200 reaches a target timing. Each of the UE 100-1 and the UE 100-2 adjusts the transmission timing on the basis of the timing advance value received from the eNB 200. Thus, the UL subframe in the UE 100-1 and the UE 100-2 are located before, on a time axis, the UL subframe in the eNB 200.

As a result, the UL subframe handled by each of the UE 100-1 and the UE 100-2 is located before, on a time axis, the DL subframe.

In such a situation, in a case that the UE 100-1 and the UE 100-2 switch from the cellular communication to the D2D communication, in the UE 100-2 (reception-side UE), a DL subframe F11 in which the data reception of the cellular communication should be performed and a UL subframe F12 in which the data reception of the D2D communication should be performed overlap on a time axis, resulting in a situation where a simultaneous reception of cellular and D2D is performed. In FIG. 7, a rear-side portion of the DL subframe F11 in which the data reception of the cellular communication should be performed overlaps a front-side portion of the UL subframe F12 in which the data reception of the D2D communication should be performed.

Thus, as shown in FIG. 8, the eNB 200 configured to assign a radio resource to the UE 100-2 assigns a radio resource corresponding to one subframe, out of the overlapping two subframes, to the UE 100-2 and assigns a radio resource corresponding to the other subframe, out of the overlapping two subframes, to the UE 100 (UE 100-X) other than the UE 100-2.

For example, the eNB 200 assigns, to the UE 100-2, the radio resource corresponding to the UL subframe F12 in which the data reception of the D2D communication should be performed, out of the overlapping two subframes. On the other hand, the eNB 200 does not assign the radio resource corresponding to the DL subframe F11 in which the data reception of the cellular communication should be performed to the UE 100-2, out of the overlapping two subframes, but assigns to another UE 100-X the radio resource. The other UE 100-X is the UE 100 configured to perform the cellular communication with the eNB 200.

Alternatively, the eNB 200 may assign, to the UE 100-2, the radio resource corresponding to the DL subframe F11 in which the data reception of the cellular communication should be performed, out of the overlapping two subframes. In this case, the eNB 200 may not assign, to the UE 100-2, the radio resource corresponding to the UL subframe F12 in which the data reception of the D2D communication should be performed, out of the overlapping two subframes, but may assign the radio resource to the other UE 100-X.

Figure 9:
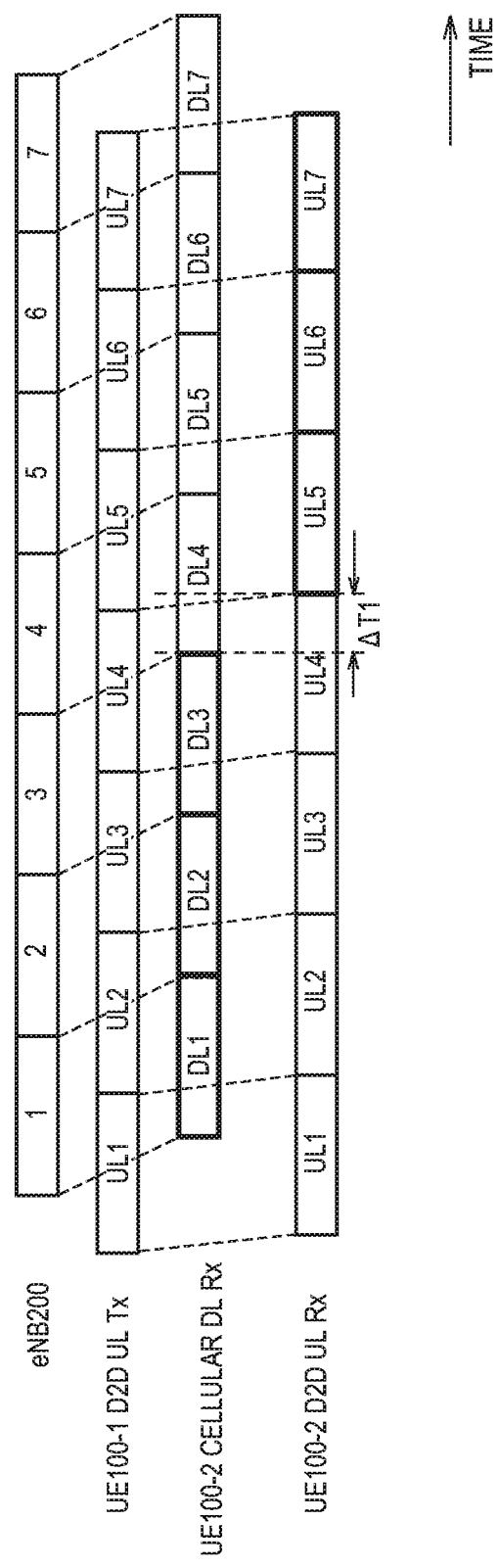
FIG. 9 is a diagram for describing a detail of the switching operation from the cellular communication to the D2D communication in a case of performing the D2D communication by using the UL radio resource, in the first embodiment.

FIG. 9 is a diagram for describing a detail of the switching operation from the cellular communication to the D2D communication.

As shown in FIG. 9, in the UE 100-2, the UL subframe is located before, on a time axis, the DL subframe. Here, a case is supposed where the cellular communication is performed until a UL subframe "UL3" and a DL subframe "DL3" then switched to the D2D communication. In this case, when the UE 100-2 performs the data reception of the D2D communication in the UL subframe "UL4", the result is that a contention occurs with the data reception of the cellular communication (DL communication) in the DL subframe "DL3".

Thus, the eNB 200 does not assign to the UE 100-2 the radio resource corresponding to the UL subframe "UL4". In other words, the eNB 200 and the UE 100-2 set the UL subframe "UL4" as a switching guard time.

Then, the eNB 200 assigns to the UE 100-2 the radio resource corresponding to each UL subframe after the UL subframe "UL5". The UE 100-2 performs the data reception of the D2D communication in each UL subframe after the UL subframe "UL5".

Figure 10:
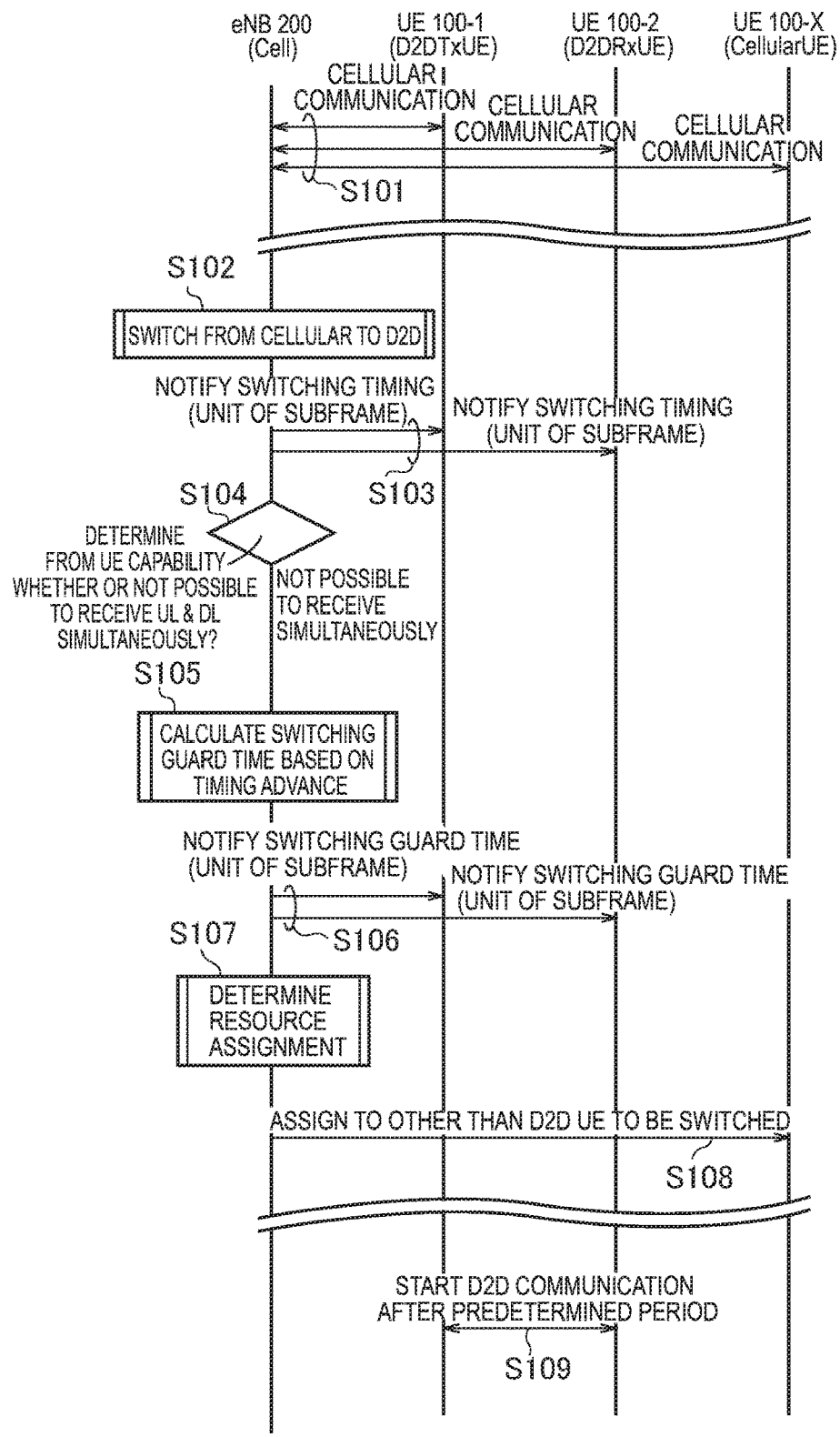
FIG. 10 is a sequence diagram showing the switching operation from the cellular communication to the D2D communication in a case of performing the D2D communication by using the UL radio resource, in the first embodiment.

FIG. 10 is a sequence diagram showing the switching operation from the cellular communication to the D2D communication. In FIG. 10, a situation is supposed where the UE 100-1 and the UE 100-2 are adjacent to each other, and UE 100-1 and the UE 100-2 perform the cellular communication therebetween through a network.

As shown in FIG. 10, in step S101, each of the UE 100-1, the UE 100-2, and UE 100-X performs the D2D communication with the eNB 200. The eNB 200 assigns the radio resource for the cellular communication to each of the UE 100-1, the UE 100-2, and the UE 100-X.

In step S102, the eNB 200 determines that the UE 100-1 and the UE 100-2 are switched from the cellular communication to the D2D communication. For example, in response to either one of the UE 100-1 or the UE 100-2 finding the other, the eNB 200 determines to switch from the cellular communication to the D2D communication. Alternatively, the eNB 200 may determine on the basis of location information of each of the UE 100-1 and the UE 100-2 to switch from the cellular communication to the D2D communication in response to the eNB 200 detecting that the UE 100-1 and the UE 100-2 are adjacent to each other. Alternatively, the eNB 200 may determine on the basis of CSI (Channel State Information) fed back from the UE 100-1 or the UE 100-2 to switch from the cellular communication to the D2D communication.

In step S103, the eNB 200 notifies, in unit of subframe, the UE 100-1 and the UE 100-2 of a switching timing from the cellular communication to the D2D communication. In an example of FIG. 9, the UE 100-1 and the UE 100-2 are notified that the cellular communication is performed until the "UL3" and the "DL3", and the cellular communication is switched to the D2D communication after the "UL3" and the "DL3". It is noted that step S103 may be performed simultaneously with step S106 described later. Alternatively, when the eNB 200 assigns a radio resource assignment for the D2D communication, step S103 may be performed simultaneously with the assignment.

In step S104, the eNB 200 confirms whether or not the UE 100-2 that is a reception-side UE in the D2D communication supports simultaneous reception of cellular and D2D. For example, the eNB 200 confirms on the basis of capability notification information (UE Capability) received from the UE 100-2 in advance whether or not the UE 100-2 supports the simultaneous reception of cellular and D2D. In this case, the capability notification information (UE Capability) includes information indicating whether or not the simultaneous reception of cellular and D2D is supported.

In a case that the UE 100-2 does not support the simultaneous reception of cellular and D2D, in step S105, the eNB 200 calculates the switching guard time in unit of subframe on the basis of the timing advance value set to the UE 100-2. For example, the eNB 200 acquires an accumulated value of the timing advance value, and determines on the basis of the accumulated value how far the UL subframe and the DL subframe overlap in the UE 100-2. It is noted that in the first embodiment, the switching guard time is in unit of subframe, and thus, such a severe determination is not necessarily necessary.

In step S106, the eNB 200 notifies the UE 100-1 and the UE 100-2 of the switching guard time in unit of subframe. In an example of FIG. 9, the eNB 200 notifies the UE 100-1 and the UE 100-2 of the "UL4" as the switching guard time.

In step S107, the eNB 200 determines assignment of a radio resource to the UE 100-1, the UE 100-2, and UE 100-X. In an example of FIG. 9, the eNB 200 determines to not assign the radio resource corresponding to the "UL4" set as the switching guard time, to the UE 100-1 and the UE 100-2, but assign the radio resource to UE 100-X.

In step S108, the eNB 200 transmits assignment information indicating the radio resource corresponding to the switching guard time, to the UE 100-X. The UE 100-X utilizes the radio resource for the cellular communication. In an example of FIG. 9, the UE 100-X utilizes the radio resource corresponding to the "UL4" for the cellular communication (UL communication).

In step S109, the UE 100-1 and UE 100-2 start the D2D communication after the switching guard time passes. In an example of FIG. 9, the UE 100-1 performs the data transmission in the "UL5", and the UE 100-2 performs the data reception in the "UL5".

Figure 11:
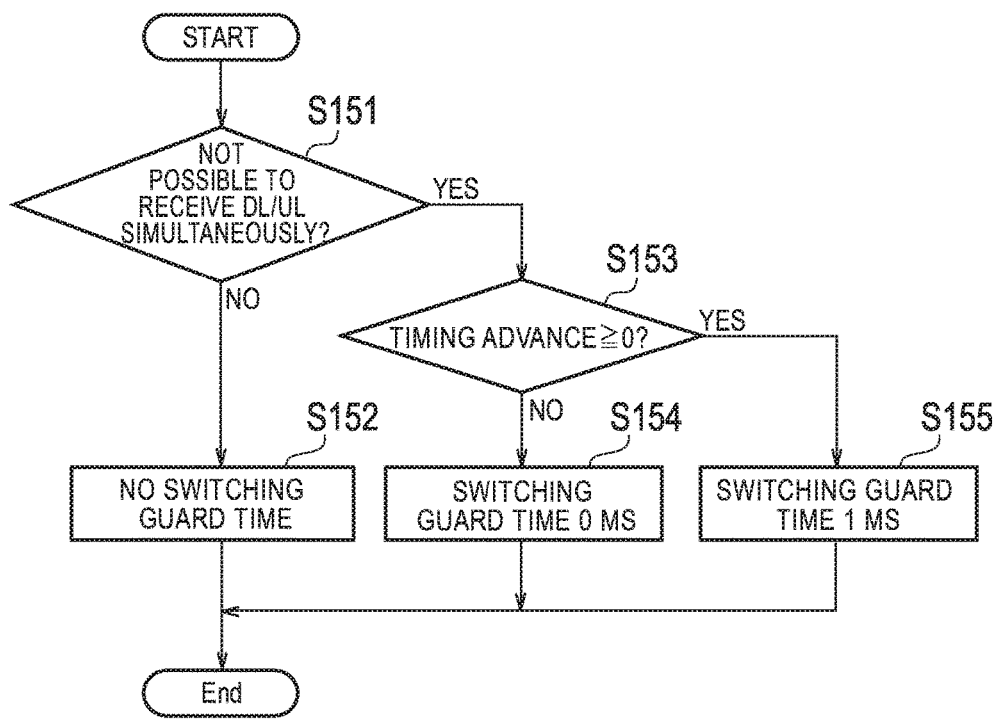
FIG. 11 is a flow diagram showing an operation of eNB in the sequence of FIG. 10.

FIG. 11 is a flow diagram showing an operation of the eNB 200 in the sequence of FIG. 10. The present flow corresponds to step S104 and S105 in FIG. 10. It is noted that the determination in the present flow may be omitted partially.

As shown in FIG. 11, in step S151, the eNB 200 confirms whether or not the UE 100-2 that is a reception-side UE in the D2D communication supports the simultaneous reception of cellular and D2D.

In a case that the UE 100-2 supports the simultaneous reception of cellular and D2D (step S151: No), the eNB 200 determines in step S152 that there is no switching guard time.

On the other hand, in a case that the UE 100-2 does not support the simultaneous reception of cellular and D2D (step S151: Yes), the eNB 200 confirms in step 153 whether or not the timing advance value (accumulated value) set to the UE 100-2 is equal to or more than zero.

In a case that the timing advance value (accumulated value) set to the UE 100-2 is less than zero (step S153: No), the eNB 200 determines in step 154 that the switching guard time is zero (that is, no switching guard time).

On the other hand, in a case that the timing advance value (accumulated value) set to the UE 100-2 is more than zero (step S153: Yes), the eNB 200 determines in step 155 that the switching guard time is one subframe (that is, 1 ms).

(1.2) Switching Operation from D2D Communication to Cellular Communication

Next, the switching operation from the D2D communication to the cellular communication will be described. It is noted that the description of the operation overlapping the aforementioned operation will be omitted.

Figure 12:
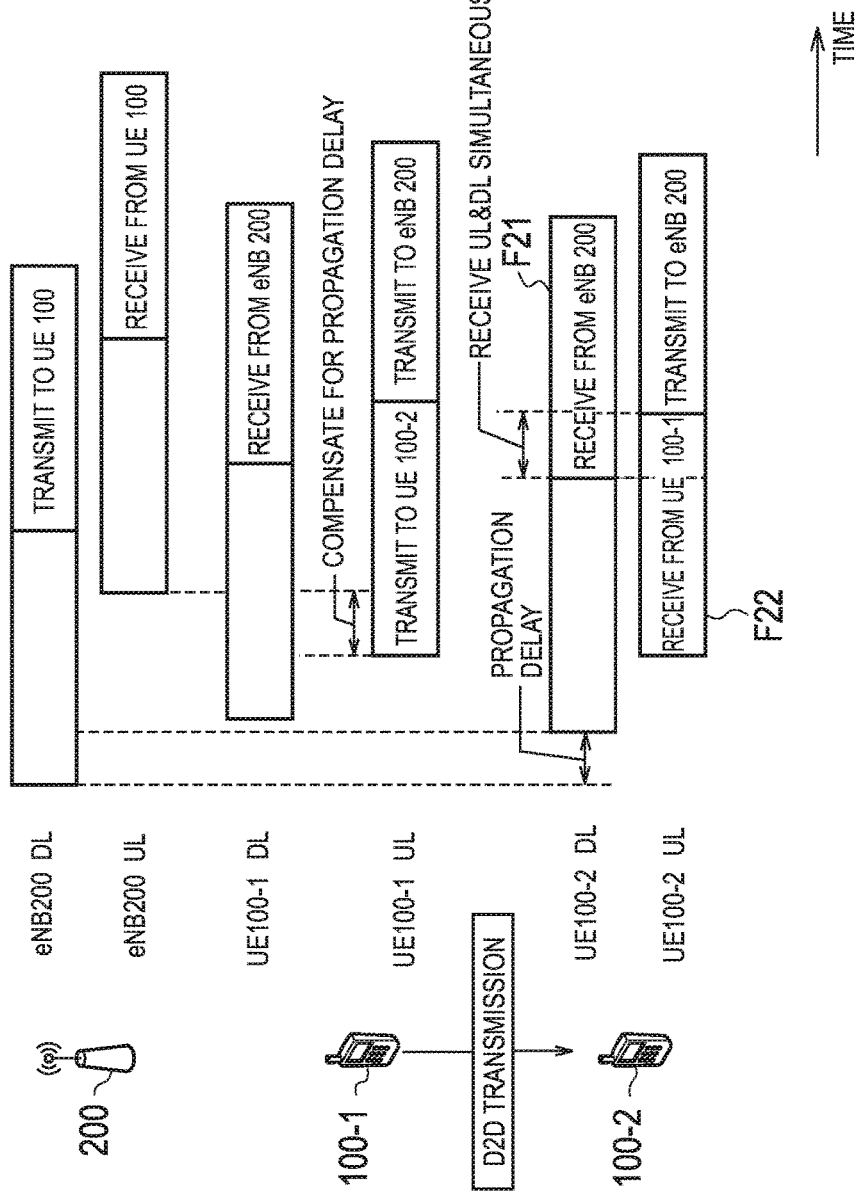
FIG. 12 is a diagram for describing a switching operation from D2D communication to cellular communication in a case of performing D2D communication by using a UL radio resource, in the first embodiment.

FIG. 12 is a diagram for describing the switching operation from the D2D communication to the cellular communication.

As shown in FIG. 12, in an initial state, the UE 100-1 and the UE 100-2 perform the D2D communication in a cell of the eNB 200. Here, an operation environment is supposed where the UE 100-1 and the UE 100-2 are located in the vicinity of the eNB 200.

In such an operation environment, contrary to the operation environment where the UE 100-1 and the UE 100-2 are located far from the eNB 200, adjustment is made so that the UL subframe timing is delayed by the timing advance value. That is, the accumulated value of the timing advance value is less than zero (negative value). As a result, the UL subframe handled by each of the UE 100-1 and the UE 100-2 is located, on a time axis, after the DL subframe.

In such a situation, in a case that the UE 100-1 and the UE 100-2 switch from the D2D communication to the cellular communication, in the UE 100-2 (reception-side UE), a DL subframe F21 in which the data reception of the cellular communication should be performed and a UL subframe F22 in which the data reception of the D2D communication should be performed overlap on a time axis, resulting in a situation where the simultaneous reception of cellular and D2D is performed. In FIG. 12, a rear-side portion of the UL subframe F22 in which the data reception of the D2D communication should be performed overlaps a front-side portion of the DL subframe F21 in which the data reception of the cellular communication should be performed.

Thus, the eNB 200 configured to assign the radio resource to the UE 100-2 assigns a radio resource corresponding to one subframe, out of the overlapping two subframes, to the UE 100-2 and assigns a radio resource corresponding to the other subframe, out of the overlapping two subframes, to the UE 100 (UE 100-X) other than the UE 100-2.

Figure 13:
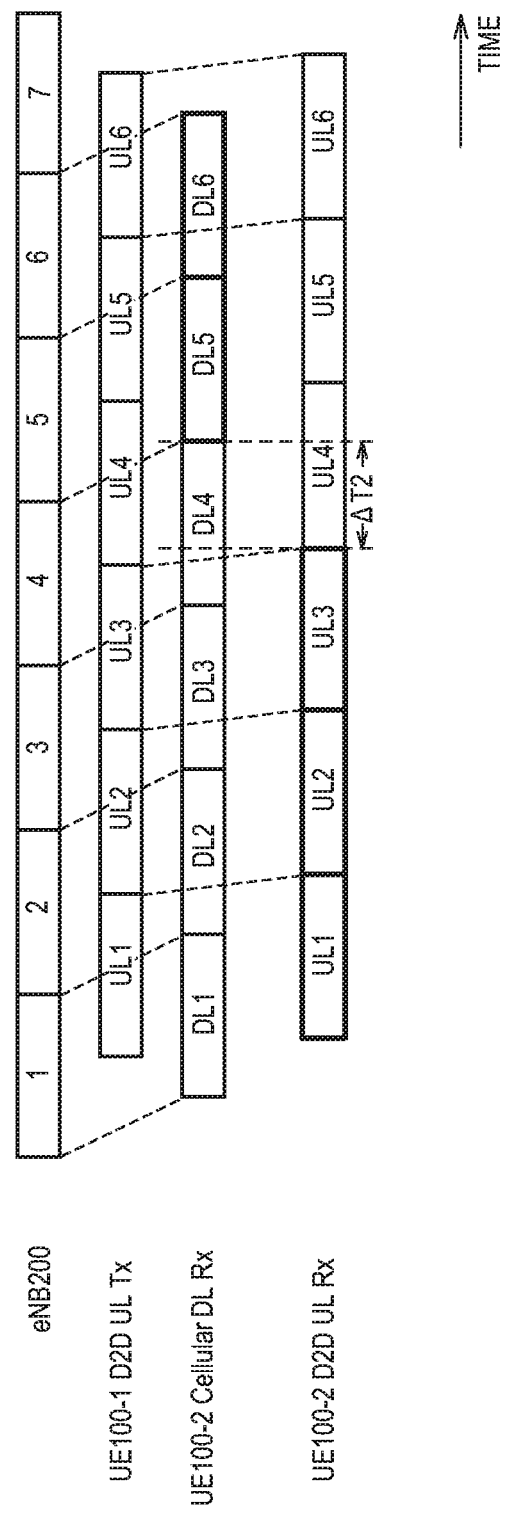
FIG. 13 is a diagram for describing a detail of the switching operation from D2D communication to cellular communication in a case of performing D2D communication by using a UL radio resource, in the first embodiment.

FIG. 13 is a diagram for describing a detail of the switching operation from the D2D communication to the cellular communication.

As shown in FIG. 13, in the UE 100-2, the DL subframe is located before, on a time axis, the UL subframe. Here, a case is supposed where the D2D communication is performed until the UL subframe "UL3" then switched to the cellular communication. In this case, when the UE 100-2 performs the data reception of the D2D communication in the "UL3", the result is that a contention occurs with the data reception of the cellular communication (DL communication) in the DL subframe "DL4".

Thus, the eNB 200 does not assign to the UE 100-2 the radio resource corresponding to the DL subframe "DL4". In other words, the eNB 200 and the UE 100-2 set the DL subframe "DL4" as the switching guard time.

Then, the eNB 200 assigns to the UE 100-2 the radio resource corresponding to each DL subframe after a DL subframe "DL5". The UE 100-2 performs the DL communication in each DL subframes after the "DL5".

(2) Case of Performing D2D Communication by Using DL Radio Resource

In a case of using the DL radio resource for the D2D communication, when the communication modes are switched between the cellular communication and the D2D communication, a situation may occur that the UL subframe in which data reception of the cellular communication should be performed and the DL subframe in which data reception of the D2D communication should be performed overlap (that is, simultaneous transmission of cellular and D2D) at least partially on a time axis. Here, the UE 100 does not necessarily have a capability to perform the simultaneous transmission of cellular and D2D. Alternatively, even in a case that the UE 100 has the capability to perform the simultaneous transmission of cellular and D2D, if the UE 100 performs the simultaneous transmission of cellular and D2D, then a communication quality deteriorates due to interference.

Therefore, in the first embodiment, when the communication modes are switched between the cellular communication and the D2D communication, in a case that the UL subframe in which the data transmission of the cellular communication should be performed and the DL subframe in which the data transmission of the D2D communication should be performed overlap at least partially on a time axis, the UE 100-1 (transmission-side UE) configured to perform the D2D communication by using the DL radio resource receives data performs the data transmission in one subframe, out of the overlapping two subframes.

Further, when the UE 100-1 switches the communication modes between the cellular communication and the D2D communication, in a case that the UL subframe in which the data transmission of the cellular communication should be performed and the DL subframe in which the data transmission of the D2D communication should be performed overlap at least partially on a time axis, the eNB 200 configured to assign the radio resource to the UE 100-1 assigns the radio resource corresponding to one subframe, to the UE 100-1, and assigns a radio resource corresponding to the other subframe, out of the overlapping two subframes, to the UE 100 (UE 100-X) other than the UE 100-1.

Therefore, in a case of utilizing the D2D radio resource for the D2D communication, when the communication modes are switched between the cellular communication and the D2D communication, it is possible to effectively utilize the radio resource and avoid the simultaneous transmission of cellular and D2D.

Below, a case of performing the D2D communication by using the DL radio resource communication will be described in order of (2.1) switching operation from the cellular communication to the D2D communication, and (2.2) switching operation from the D2D communication to the cellular communication. It is noted that the description of the operation overlapping the aforementioned operation will be omitted.

(2.1) Switching Operation from Cellular Communication to D2D Communication

Figure 14:
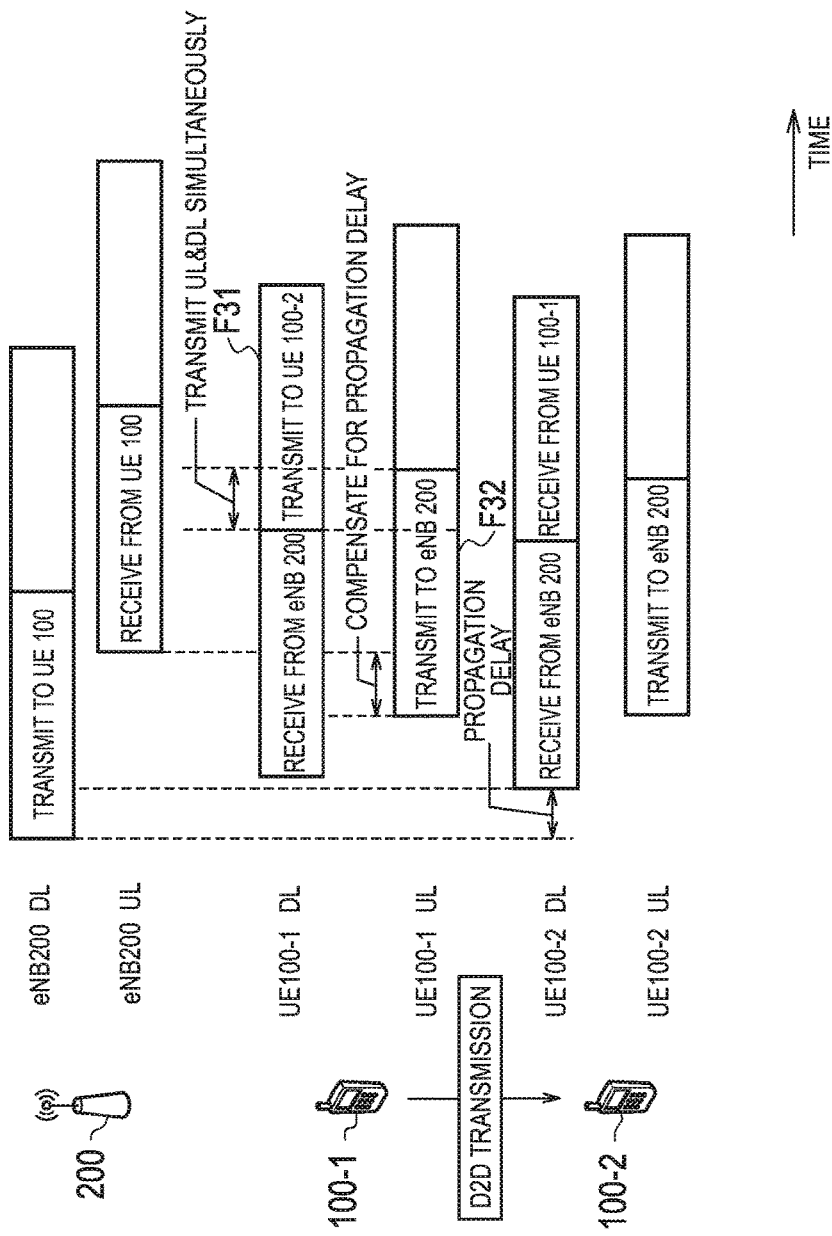
FIG. 14 is a diagram for describing the switching operation from the cellular communication to the D2D communication in a case of performing the D2D communication by using a DL radio resource, in the first embodiment.

FIG. 14 is a diagram for describing the switching operation from the cellular communication to the D2D communication.

As shown in FIG. 14, in an initial state, each of the UE 100-1 and the UE 100-2 performs the cellular communication (the UL communication and the DL communication) in a cell of the eNB 200. Here, an operation environment is supposed where the UE 100-1 and the UE 100-2 are located in the vicinity of the eNB 200. In such an operation environment, the UL subframe handled by each of the UE 100-1 and the UE 100-2 is located, on a time axis, after the DL subframe.

In such a situation, in a case that the UE 100-1 and the UE 100-2 switch from the cellular communication to the D2D communication, in the UE 100-1 (transmission-side UE), a UL subframe F32 in which the data transmission of the cellular communication should be performed and a DL subframe F31 in which the data transmission of the D2D communication should be performed overlap on a time axis, resulting in a situation where the simultaneous transmission of cellular and D2D is performed. In FIG. 14, a rear-side portion of the UL subframe F32 in which the data transmission of the cellular communication should be performed overlaps front-side portion of the DL subframe F31 in which the data transmission of the D2D communication should be performed overlap.

Thus, the eNB 200 configured to assign the radio resource to the UE 100-1 assigns a radio resource corresponding to one of the overlapping two subframes to the UE 100-1 and assigns a radio resource corresponding to the other subframe of the overlapping two subframes to the UE 100 other than the UE 100-1 (UE 100-X).

For example, the eNB 200 assigns to the UE 100-1 the radio resource corresponding to the DL subframe F31 in which the data transmission of the D2D communication should be performed, out of the overlapping two subframes. On the other hand, the eNB 200 does not assign to the UE 100-1 the radio resource corresponding to the UL subframe F32 in which the data transmission of the cellular communication should be performed, out of the overlapping two subframes, but assigns the radio resource to another UE 100-X.

Alternatively, the eNB 200 may assign to the UE 100-1 the radio resource corresponding to the UL subframe F32 in which the data transmission of the cellular communication should be performed, out of the overlapping two subframes. In this case, the eNB 200 may not assign to the UE 100-1 the radio resource corresponding to the DL subframe F31 in which the data transmission of the D2D communication should be performed, out of the overlapping two subframes, but may assign the radio resource to another UE 100-X.

Figure 15:
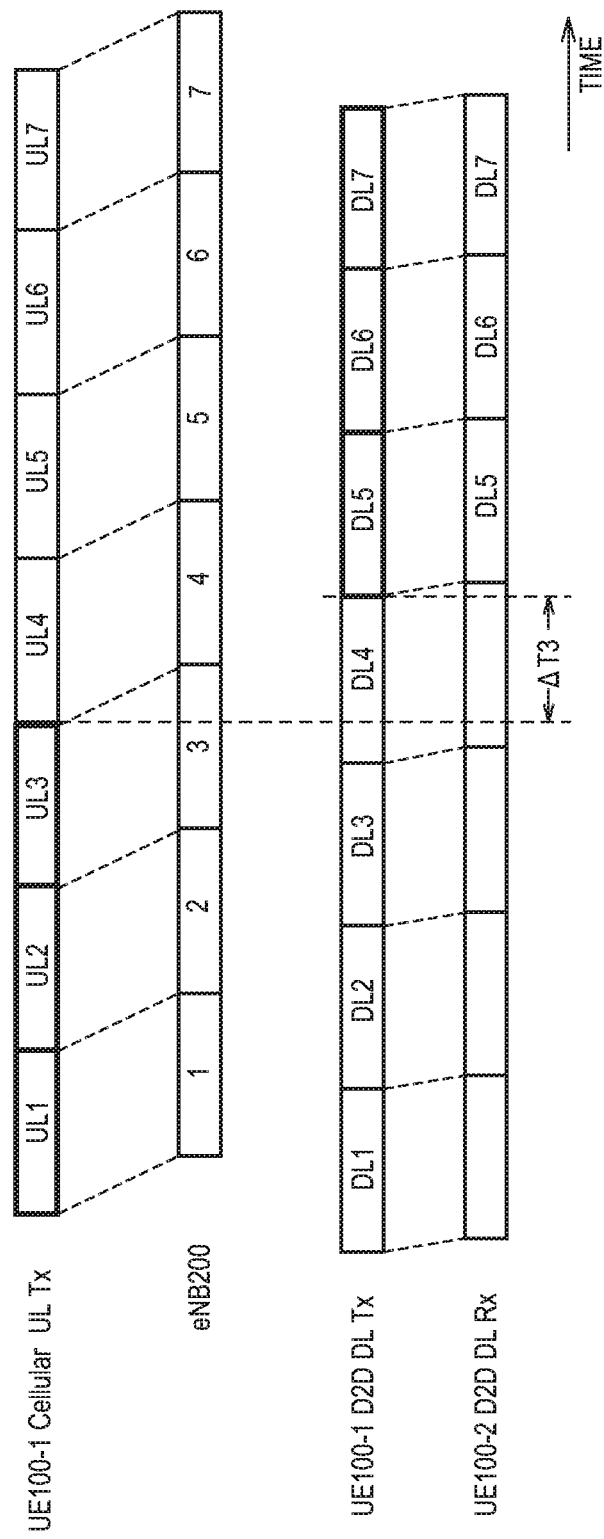
FIG. 15 is a diagram for describing a detail of the switching operation from the cellular communication to the D2D communication in a case of performing the D2D communication by using the DL radio resource, in the first embodiment.

FIG. 15 is a diagram for describing a detail of the switching operation from the cellular communication to the D2D communication.

As shown in FIG. 15, in the UE 100-1, the DL subframe is located before, on a time axis, the UL subframe. Here, a case is supposed where the cellular communication is performed until the UL subframe "UL3" then switched to the D2D communication. In this case, when the UE 100-1 performs the data transmission of the cellular communication in the UL subframe "UL4", which is next to the UL subframe "UL3", the result is that a contention occurs with the data transmission of the D2D communication in the DL subframe "DL5".

Thus, the eNB 200 does not assign to the UE 100-1 the radio resource corresponding to the UL subframe "UL4". In other words, the eNB 200 and the UE 100-1 set the UL subframe "UL4" as the switching guard time.

Then, the eNB 200 assigns to the UE 100-1 the radio resource corresponding to each DL subframes after the DL subframe "DL5". The UE 100-1 performs the data transmission of the D2D communication in each DL subframe after the DL subframe "DL5".

(2.2) Switching Operation from D2D Communication to Cellular Communication

Next, the switching operation from the D2D communication to the cellular communication will be described. It is noted that the description of the operation overlapping the aforementioned operation will be omitted.

Figure 16:
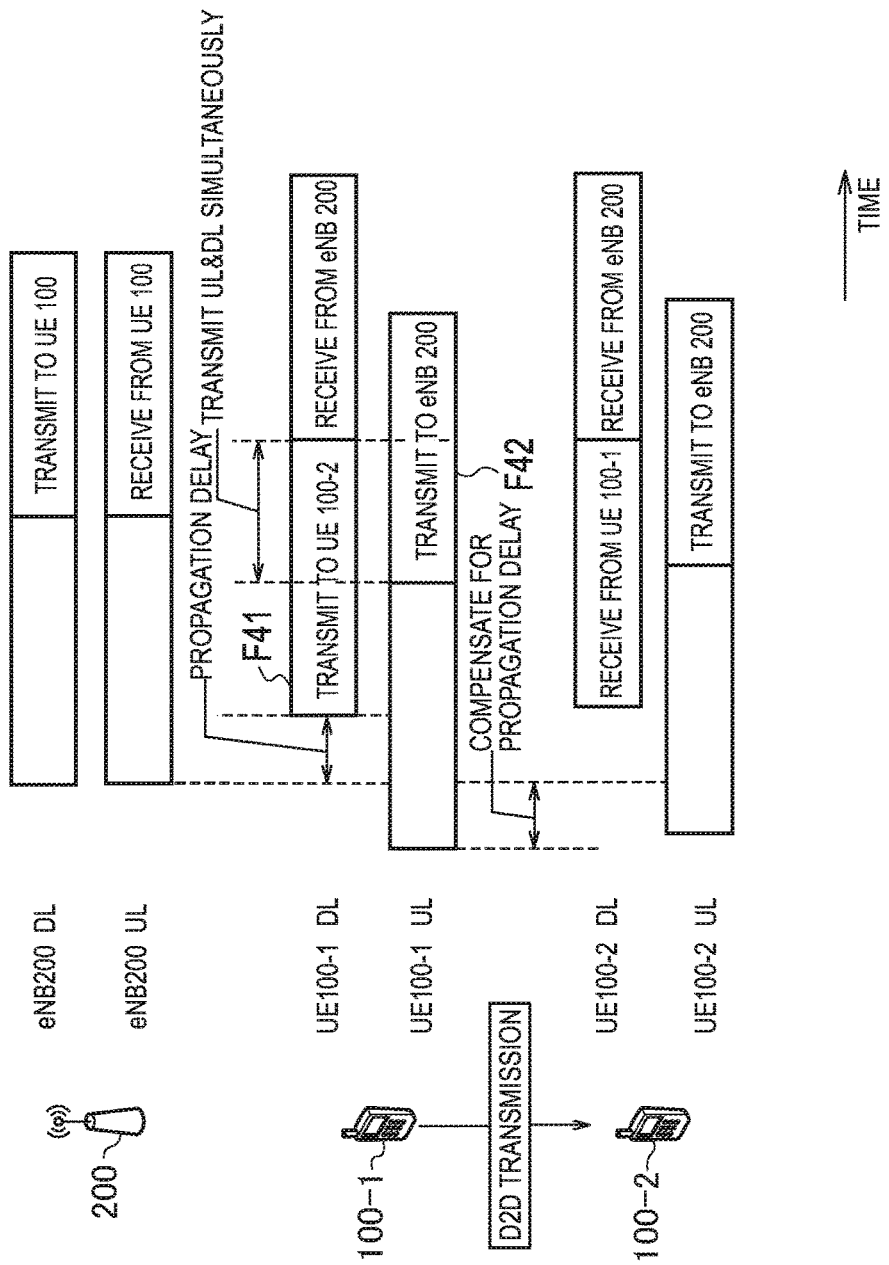
FIG. 16 is a diagram for describing a switching operation from D2D communication to cellular communication in a case of performing D2D communication by using a DL radio resource, in the first embodiment.

FIG. 16 is a diagram for describing the switching operation from the D2D communication to the cellular communication.

As shown in FIG. 16, in an initial state, the UE 100-1 and the UE 100-2 perform the D2D communication in a cell of the eNB 200. Here, an operation environment is supposed where the UE 100-1 and the UE 100-2 are located far from the eNB 200. In such an operation environment, adjustment is made so that the UL subframe timing is advanced by the timing advance value. That is, the accumulated value of the timing advance value is a positive value. As a result, the DL subframe handled by each of the UE 100-1 and the UE 100-2 is located, on a time axis, after the UL subframe.

In such a situation, in a case that the UE 100-1 and the UE 100-2 switch from the D2D communication to the cellular communication, in the UE 100-1 (transmission-side UE), a UL subframe F42 in which the data transmission of the cellular communication should be performed and a DL subframe F41 in which the data transmission of the D2D communication should be performed overlap on a time axis, resulting in a situation where the simultaneous transmission of cellular and D2D is performed. In FIG. 16, a rear-side portion of the DL subframe F41 in which the data transmission of the D2D communication should be performed overlaps a front-side portion of the DL subframe F42 in which the data transmission of the cellular communication should be performed.

Thus, the eNB 200 configured to assign the radio resource to the UE 100-1 assigns a radio resource corresponding to one of the overlapping two subframes to the UE 100-1 and assigns a radio resource corresponding to the other subframe of the overlapping two subframes to the UE 100 other than the UE 100-1 (UE 100-X).

Figure 17:
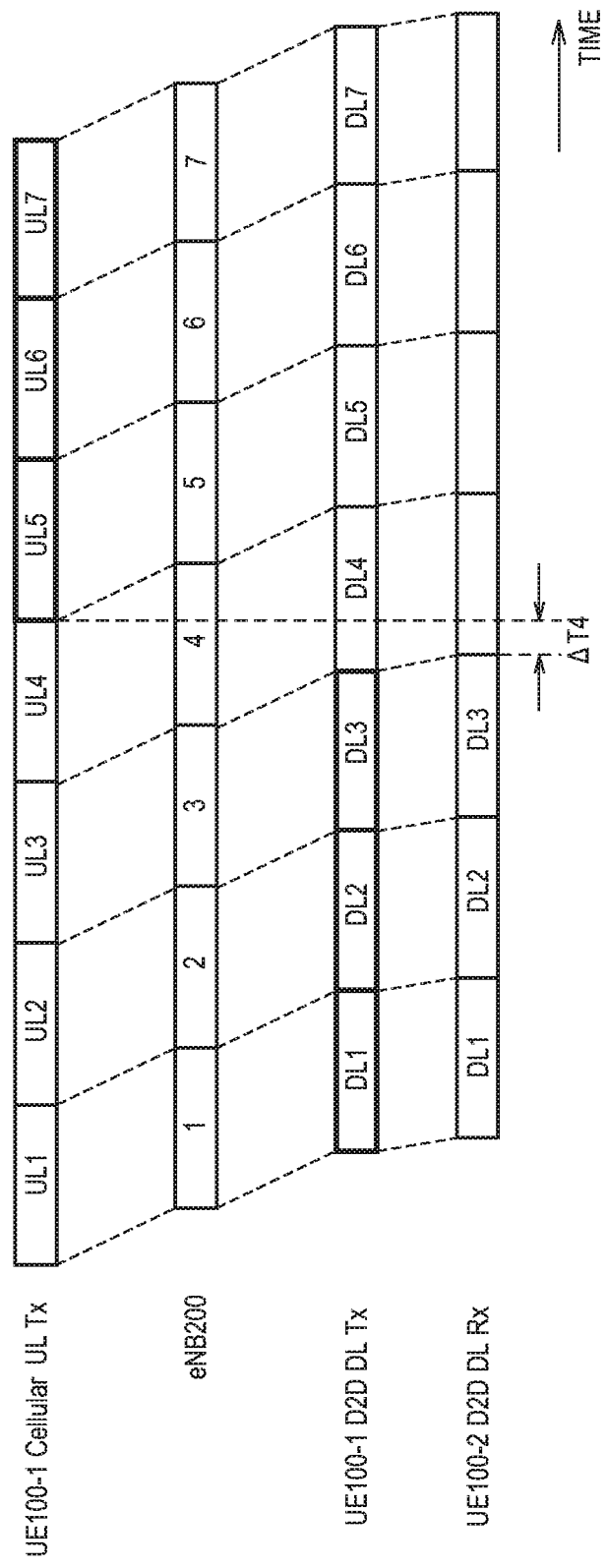
FIG. 17 is a diagram for describing a detail of the switching operation from D2D communication to cellular communication in a case of performing D2D communication by using a DL radio resource, in the first embodiment.

FIG. 17 is a diagram for describing a detail of the switching operation from the D2D communication to the cellular communication.

As shown in FIG. 17, in the UE 100-1, the UL subframe is located before, on a time axis, the DL subframe. Here, a case is supposed where the D2D communication is performed until the DL subframe "DL3" then switched to the cellular communication. In this case, when the UE 100-1 performs the data transmission of the D2D communication in the "DL3", the result is that a contention occurs with the data transmission of the cellular communication (UL communication) in the UL subframe "UL4".

Thus, the eNB 200 does not assign to the UE 100-1 the radio resource corresponding to the UL subframe "UL4". In other words, the eNB 200 and the UE 100-1 set the UL subframe "UL4" as the switching guard time.

Then, the eNB 200 assigns to the UE 100-1 the radio resource corresponding to each UL subframe after the UL subframe "UL5" and the radio resource corresponding to each DL subframe after the DL subframe "DL5". The UE 100-1 performs the UL communication in each UL subframe after the UL subframe "UL5" and performs the DL communication in each DL subframe after the DL subframe "DL5".

Second Embodiment

In a second embodiment, description proceeds with a particular focus on a difference from the first embodiment.

In the above-described first embodiment, the switching guard time is set in unit of subframe, and in the second embodiment, the switching guard time is set in unit of symbol.

In the second embodiment, in a case of performing the D2D communication by using the UL radio resource, the other subframe, out of the overlapping two subframes, includes a non-overlapping interval having no overlapping with one subframe on a time axis. The UE 100-2 (reception-side UE) further performs the data reception in the non-overlapping interval included in the other subframe. The eNB 200 configured to assign the radio resource to the UE 100-2 assigns the radio resource corresponding to one subframe, to the UE 100-2, and assigns the radio resource corresponding to the non-overlapping interval included in the other subframe, to the UE 100-2. As a result, when the communication modes are switched between the cellular communication and the D2D communication, it is possible to further enhance a utilization efficiency of the radio resource and avoid the simultaneous reception of cellular and D2D.

In the second embodiment, in a case of performing the D2D communication by using the DL radio resource, the other subframe, out of the overlapping two subframes, includes the non-overlapping interval having no overlapping with one subframe on a time axis. The UE 100-1 (transmission-side UE) further performs the data transmission in the non-overlapping interval included the other subframe. The eNB 200 configured to assign the radio resource to the UE 100-1 assigns the radio resource corresponding to one subframe, to the UE 100-1, and assigns the radio resource corresponding to the non-overlapping interval included in the other subframe, to the UE 100-1. As a result, when the communication modes are switched between the cellular communication and the D2D communication, it is possible to further enhance a utilization efficiency of the radio resource and avoid the simultaneous transmission of cellular and D2D.

Figure 18:
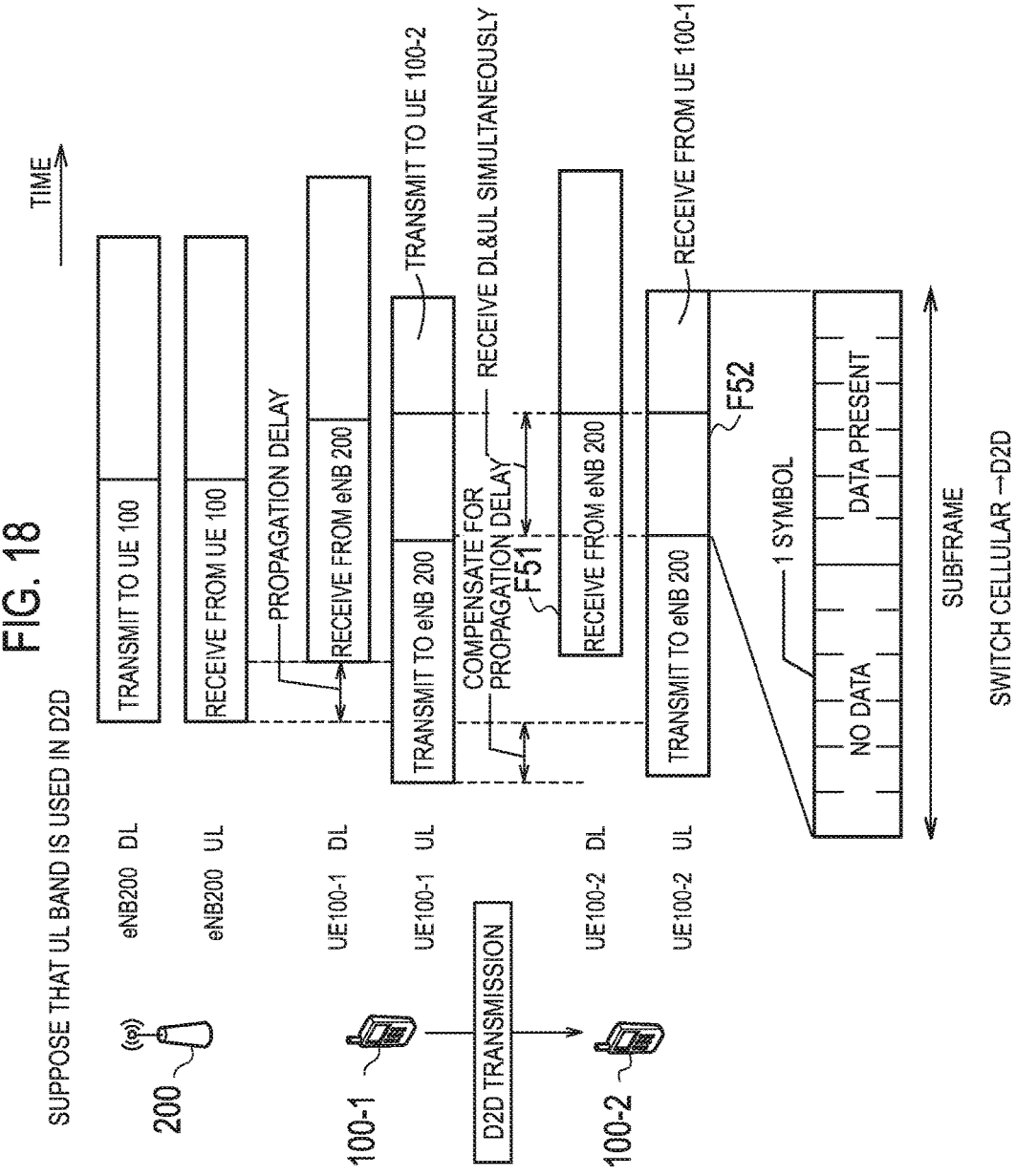
FIG. 18 is a diagram for describing an operation according to the second embodiment.

FIG. 18 is a diagram for describing an operation according to the second embodiment. Here, in a case of performing the D2D communication by using the UL radio resource, the switching operation from the cellular communication to the D2D communication will be described. It is noted that it is possible to apply this feature to the switching operation from the D2D communication to the cellular communication and also to a case that the D2D communication is performed by using the DL radio resource.

As shown in FIG. 18, in an initial state, each of the UE 100-1 and the UE 100-2 performs the cellular communication (the UL communication and the DL communication) in a cell of the eNB 200. Here, an operation environment is supposed where the UE 100-1 and the UE 100-2 are located far from the eNB 200. In such an operation environment, the UL subframe the UL subframe handled by each of the UE 100-1 and the UE 100-2 is located before, on a time axis, the DL subframe.

In such a situation, in a case that the UE 100-1 and the UE 100-2 switch from the cellular communication to the D2D communication, in the UE 100-2 (reception-side UE), a situation occurs that a DL subframe F51 in which the data reception of the cellular communication should be performed and a UL subframe F52 in which the data reception of the D2D communication should be performed overlap on a time axis, resulting in a situation where the simultaneous cellular and D2D reception is performed. In FIG. 18, a rear-side portion of the DL subframe F51 in which the data reception of the cellular communication should be performed overlaps a front-side portion of the DL subframe F52 in which the data reception of the D2D communication should be performed.

Thus, in the second embodiment, the eNB 200 configured to assign the radio resource to the UE 100-2 assigns the radio resource corresponding to one subframe, out of the overlapping two subframes, to the UE 100-2, and assigns the radio resource corresponding to the non-overlapping interval included in the other subframe, to the UE 100-2.

In FIG. 18, the eNB 200 assigns to the UE 100-2 the radio resource corresponding to the DL subframe F51 in which the data reception of the cellular communication should be performed, out of the overlapping two subframes. Further, the eNB 200 assigns, in unit of symbol, to the UE 100-2 the radio resource corresponding to the non-overlapping interval included in the UL subframe F52 in which the data reception of the D2D communication should be performed, out of the overlapping two subframes.

As a result, in the UL subframe F52 in which the data reception of the D2D communication should be performed, the overlapping interval overlapping the DL subframe in which the data reception of the cellular communication should be performed is set as the switching guard time (interval with no data). Further, in the UL subframe F52 in which the data reception of the D2D communication should be performed, the non-overlapping interval not overlapping the DL subframe F51 in which the data reception of the cellular communication should be performed is set as an interval where the data reception is performed.

It is noted that to notify the UE 100-1 and the UE 100-2 of the switching guard time, the eNB 200 may transmit to the UE 100-1 and the UE 100-2 symbol identification information indicating each symbol configuring the switching guard time, and may also transmit to the UE 100-1 and the UE 100-2 format identification information indicating a setting format for the switching guard time.

Figure 19:
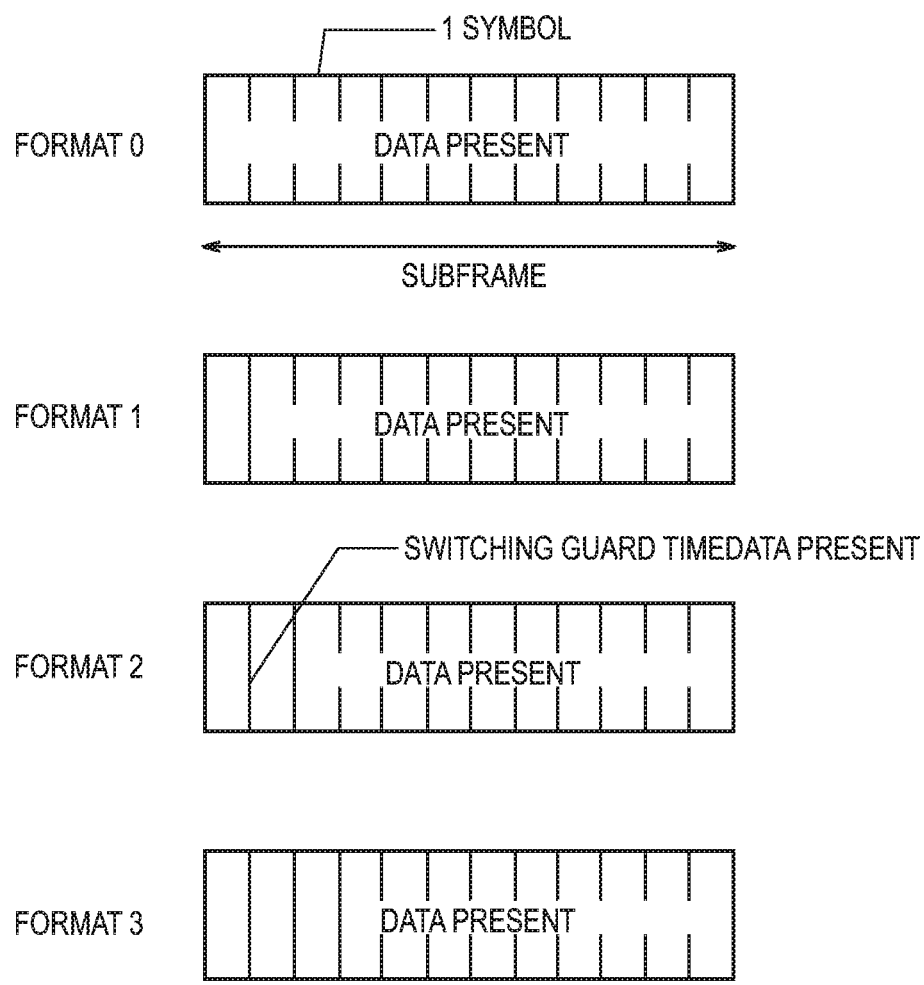
FIG. 19 is a diagram for describing format identification information indicating a setting format for a switching guard time according to the second embodiment to the third embodiment.

FIG. 19 is a diagram for describing the format identification information indicating a setting format for the switching guard time.

As shown in FIG. 19, a plurality of setting formats of the switching guard time are defined in advance. A format 0 is a format where there is no switching guard time. In an example of FIG. 19, a format 1 is a format in which a head symbol of the subframe is designated as the switching guard time. A format 2 is a format in which the head symbol of the subframe and a second symbol thereof are designated as the switching guard time. A format 3 is a format in which the head symbol of the subframe to a third symbol thereof are designated as the switching guard time. It is noted that FIG. 19 provides just an example, and the number of symbols in the switching guard time may be defined as any number.

Figure 20:
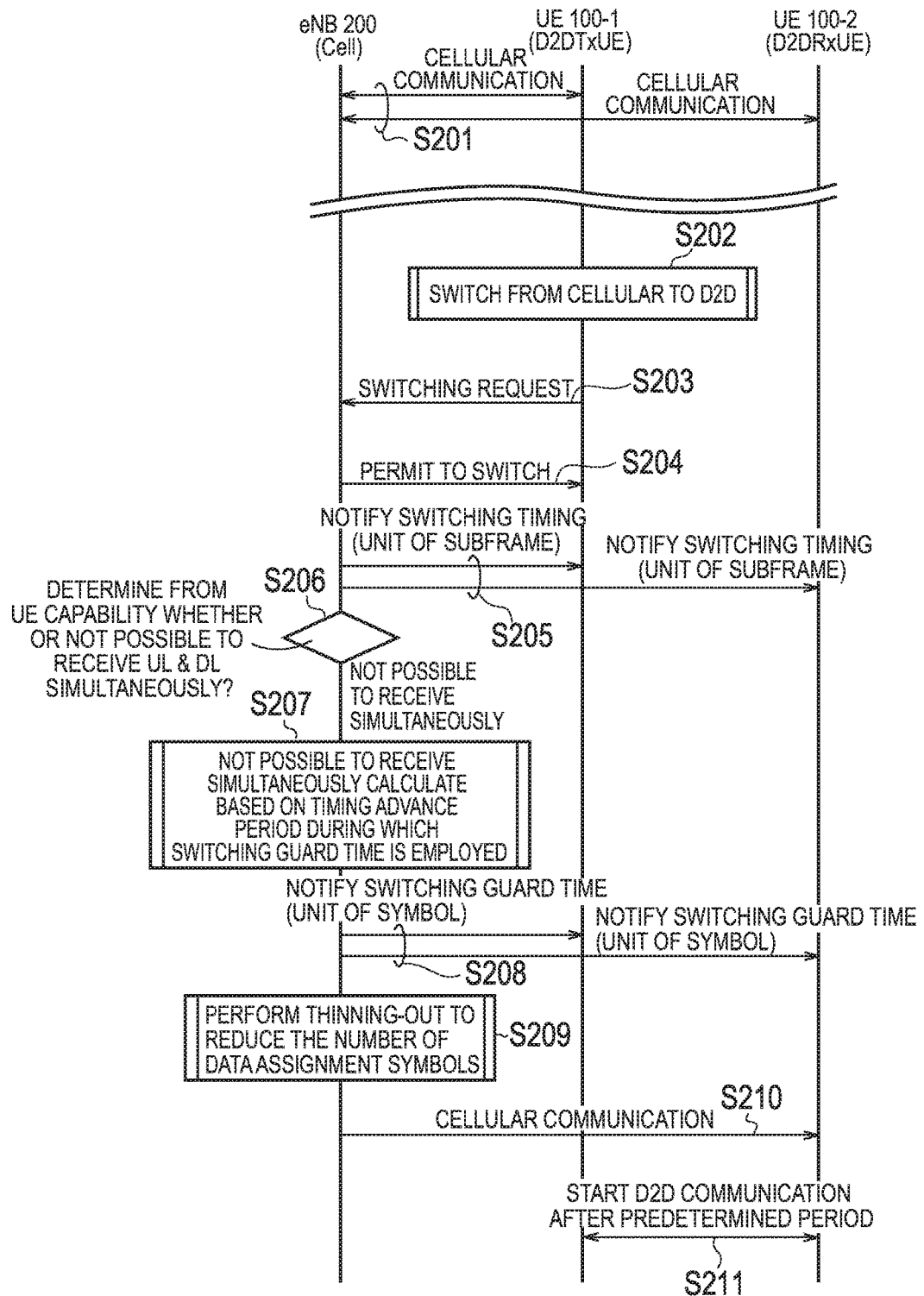
FIG. 20 is a sequence diagram showing a switching operation from cellular communication to D2D communication in a case of performing D2D communication by using a UL radio resource in the second embodiment.

FIG. 20 is a sequence diagram showing the switching operation from the cellular communication to the D2D communication in a case of performing the D2D communication by using the UL radio resource. In FIG. 20, a situation is supposed where the UE 100-1 and the UE 100-2 are adjacent to each other and the UE 100-1 and the UE 100-2 perform the cellular communication therebetween through a network. Further, in FIG. 20, an example is described where the switching from the cellular communication to the D2D communication is determined by the UE 100-1; however, the switching may be determined by the eNB 200.

As shown in FIG. 20, in step S201, each of the UE 100-1 and the UE 100-2 performs the cellular communication with the eNB 200. The eNB 200 assigns to each of the UE 100-1 and the UE 100-2 the radio resource for the cellular communication.

In step S202, the UE 100-1 determines to switch from the cellular communication to the D2D communication. For example, the UE 100-1 determines to switch from the cellular communication to the D2D communication in response to the UE 100-2 being discovered.

In step S203, the UE 100-1 transmits to the eNB 200 a switching request to request a switch from the cellular communication to the D2D communication.

In step S204, the eNB 200 configured to receive the switching request transmits to the UE 100-1 a switching permission to permit a switch from the cellular communication to the D2D communication. It is noted that step S204 may be performed simultaneously with step S205 or S208 described later.

In step S205, the eNB 200 notifies, in unit of subframe, the UE 100-1 and the UE 100-2 of the switching timing from the cellular communication to the D2D communication. It is noted that S205 may be performed simultaneously with step S208 described later.

In step S206, the eNB 200 confirms whether or not the UE 100-2 that is a reception-side UE in the D2D communication supports the simultaneous reception of cellular and D2D.

When the UE 100-2 does not support the simultaneous reception of cellular and D2D, in step S207, the eNB 200 calculate, in unit of symbol, the switching guard time on the basis of the timing advance value set to the UE 100-2. For example, the eNB 200 acquires an accumulated value of the timing advance value, and determines on the basis of the accumulated value how far the UL subframe and the DL subframe overlap in the UE 100-2.

In step S208, the eNB 200 notifies, in unit of symbol, the UE 100-1 and the UE 100-2 of the switching guard time. As described above, it is possible to notify the switching guard time by an index of the format.

In step S209, the eNB 200 performs thinning-out of the user data in accordance with the switching guard time to reduce the number of data assignment symbols.

In step S210, the eNB 200 transmits to the UE 100-1 the user data that is thinned-out.

In step S211, the UE 100-1 and the UE 100-2 starts the D2D communication after the switching guard time passes.

Figure 21:
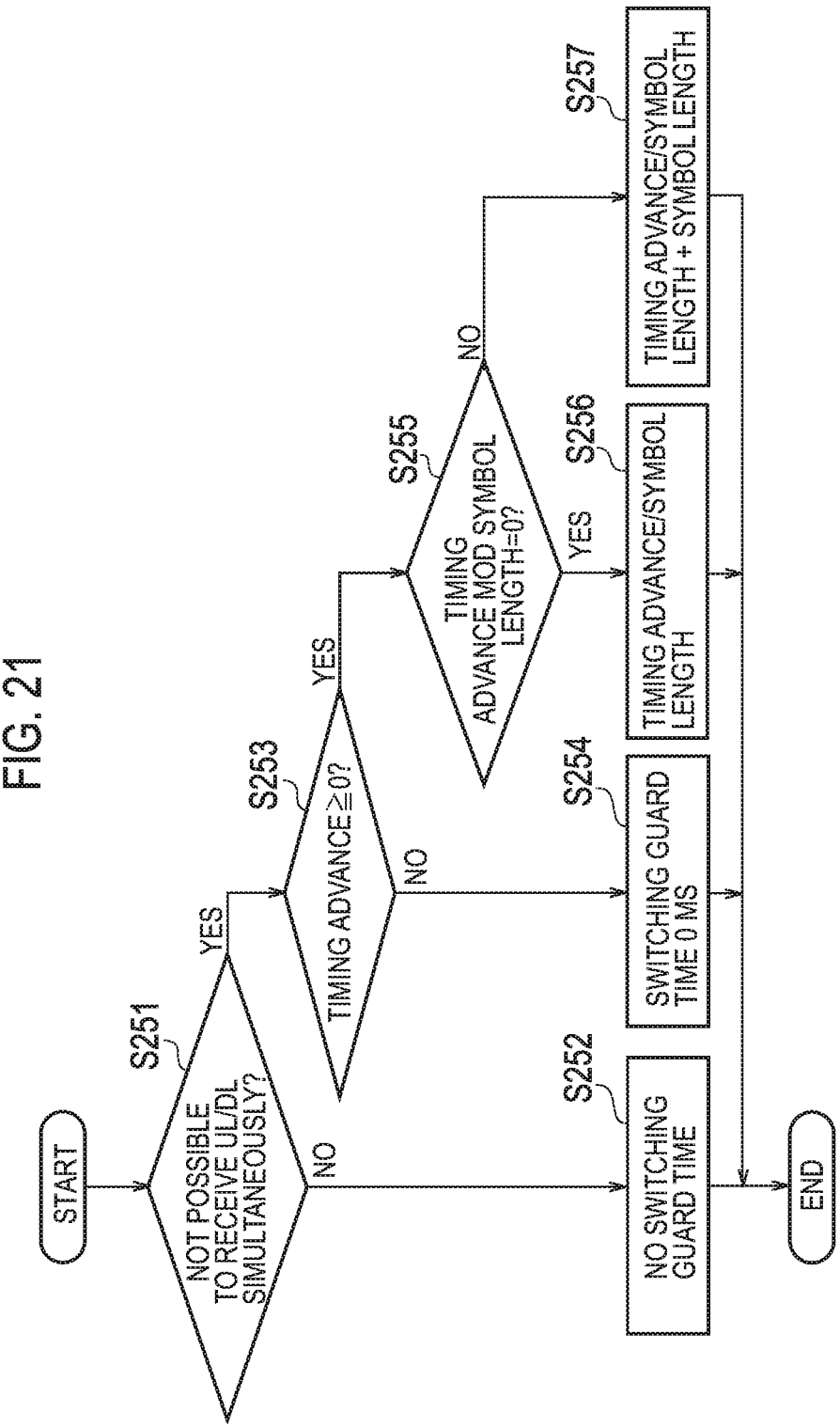
FIG. 21 is a flow diagram showing an operation of eNB 200 in the sequence in FIG. 20.

FIG. 21 is a flow diagram showing an operation of the eNB 200 in the sequence shown in FIG. 20. The present flow corresponds to step S206 and S207 in FIG. 20. It is noted that the determination in the present flow may be omitted partially.

As shown in FIG. 21, in step S251, the eNB 200 confirms whether or not the UE 100-2 that is a reception-side UE in the D2D communication supports the simultaneous reception of cellular and D2D.

When the UE 100-2 supports the simultaneous reception of cellular and D2D (step S251: No), the eNB 200 determines in step S252 that there is no switching guard time.

On the other hand, when the UE 100-2 does not support the simultaneous reception of cellular and D2D (step S251: Yes), in step 253, the eNB 200 confirms whether or not the timing advance value (accumulated value) set to the UE 100-2 is equal to or more than zero.

When the timing advance value (accumulated value) set to the UE 100-2 is less than zero (step S253: No), in step 254, the eNB 200 determines that the switching guard time is zero (that is, there is no switching guard time).

On the other hand, when the timing advance value set to the UE 100-2 (accumulated value) is equal to or more than zero (step S253: Yes), in step 255, the eNB 200 confirms whether or not the remainder obtained by dividing the timing advance value (accumulated value) by a symbol length is zero.

When "Yes" is determined in step S255, in step S256, the eNB 200 designates the value obtained by dividing the timing advance value (accumulated value) by the symbol length as the number of symbols in the switching guard time. As a result, it is possible to set the switching guard time having a time length corresponding to the overlapping interval.

On the other hand, when "No" is determined in step S255, in step S257, the eNB 200 designates, as the number of symbols in the switching guard time, a result obtained by adding "1" to the value obtained by dividing the timing advance value (accumulated value) by the symbol length. As a result, it is possible to set the switching guard time having a time length covering the overlapping interval.

Third Embodiment

In a third embodiment, description proceeds with a particular focus on a difference from the first embodiment and the second embodiment.

The third embodiment is in much the same way as in the second embodiment in that the switching guard time is set in unit of symbol. It is noted that the third embodiment differs from the second embodiment in that an interval other than the switching guard time is used for transmitting or receiving a discovery-use signal for the D2D communication (hereinafter, called "Discovery signal") in the subframe in which the switching guard is arranged.

In the third embodiment, in a case of performing the D2D communication by using the UL radio resource, the other subframe, out of the overlapping two subframes, includes a non-overlapping interval not overlapping, on a time axis, the one subframe. The UE 100-2 (reception-side UE) further transmits the Discovery signal in the non-overlapping interval included in the one subframe. The eNB 200 configured to assign the radio resource to the UE 100-2 assigns the radio resource corresponding to one subframe, to the UE 100-2, and assigns, to the UE 100-2, the radio resource corresponding to the non-overlapping interval included in the other subframe for transmitting or receiving the Discovery signal. As a result, when the communication modes are switched between the cellular communication and the D2D communication, it is possible to further enhance a utilization efficiency of the radio resource and avoid the simultaneous reception of cellular and D2D.

In the third embodiment, in a case of performing the D2D communication by using the DL radio resource, the other subframe, out of the overlapping two subframes, includes the non-overlapping interval not overlapping, on a time axis, the one subframe. The UE 100-1 (transmission-side UE) further transmits or receives the Discovery signal in the non-overlapping interval included in the other subframe. The eNB 200 configured to assign the radio resource to the UE 100-1 assigns the radio resource corresponding to one subframe, to the UE 100-1, and assigns, to the UE 100-1, the radio resource corresponding to the non-overlapping interval included in the other subframe for transmitting or receiving the Discovery signal. As a result, when the communication modes are switched between the cellular communication and the D2D communication, it is possible to further enhance a utilization efficiency of the radio resource and avoid the simultaneous transmission of cellular and D2D.

Figure 22:
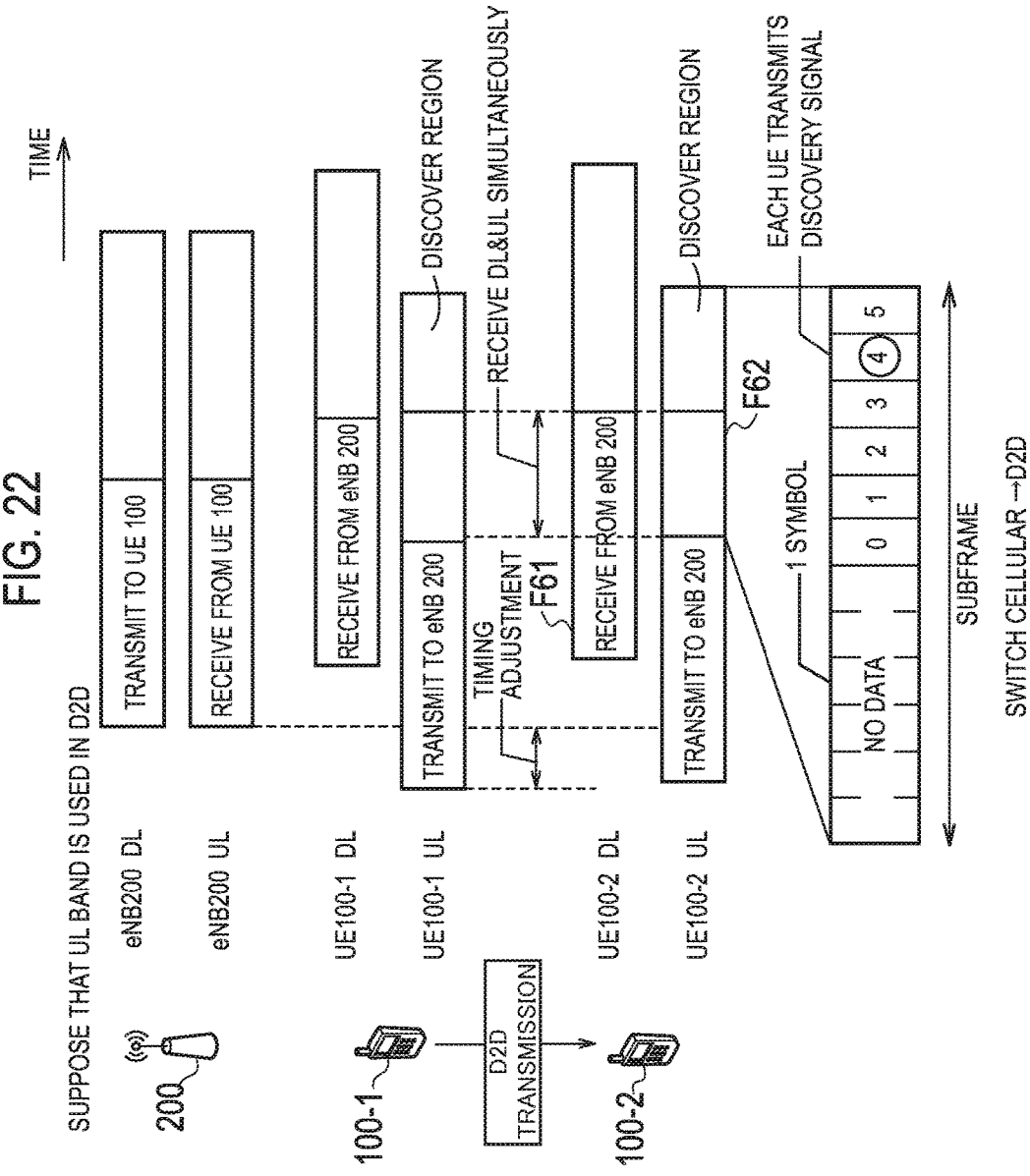
FIG. 22 is a diagram for describing an operation according to the third embodiment.

FIG. 22 is a diagram for describing an operation according to the third embodiment. Here, in a case of performing the D2D communication by using the UL radio resource, the switching operation from the cellular communication to the D2D communication will be described. It is noted that it is possible to apply this notification to the switching operation from the D2D communication to the cellular communication and also to a case that the D2D communication is performed by using the DL radio resource.

As shown in FIG. 22, in an initial state, each of the UE 100-1 and the UE 100-2 performs the cellular communication (the UL communication and the DL communication) in a cell of the eNB 200. Here, an operation environment is supposed where the UE 100-1 and the UE 100-2 are located far from the eNB 200. In such an operation environment, the UL subframe handled by each of the UE 100-1 and the UE 100-2 is located before, on a time axis, the DL subframe.

In such a situation, in a case that the UE 100-1 and the UE 100-2 switch from the cellular communication to the D2D communication, in the UE 100-2 (reception-side UE), a situation occurs that a DL subframe F61 in which the data reception of the cellular communication should be performed and a UL subframe F62 in which the data reception of the D2D communication should be performed overlap on a time axis, resulting in a situation where the simultaneous cellular and D2D reception is performed. In FIG. 22, a rear-side portion of the DL subframe F61 in which the data reception of the cellular communication should be performed overlaps a front-side portion of the UL subframe F62 in which the data reception of the D2D communication should be performed.

Thus, in the third embodiment, The eNB 200 configured to assign the radio resource to the UE 100-2 assigns the radio resource corresponding to one subframe, out of the overlapping two subframes, to the UE 100-2 and assigns, to the UE 100-2, the radio resource corresponding to the non-overlapping interval included in the other subframe for transmitting or receiving the Discovery signal.

In FIG. 22, the eNB 200 assigns to the UE 100-2 the radio resource corresponding to the DL subframe F61 in which the data reception of the cellular communication should be performed, out of the overlapping two subframes. Further, the eNB 200 assigns, in unit of symbol, to the UE 100-2 the radio resource corresponding to the non-overlapping interval included in the UL subframe F62 in which the data reception of the D2D communication should be performed, out of the overlapping two subframes.

As a result, in the UL subframe F62 in which the data reception of the D2D communication should be performed, the overlapping interval overlapping the DL subframe F61 in which the data reception of the cellular communication should be performed is set as the switching guard time (interval having no data). Further, in the UL subframe F62 in which the data reception of the D2D communication should be performed, the non-overlapping interval not overlapping the DL subframe F61 in which the data reception of the cellular communication should be performed is set as the interval in which the Discovery signal is transmitted or received.

It is noted that to notify the UE 100-1 and the UE 100-2 of the switching guard time, the eNB 200 may transmit to the UE 100-1 and the UE 100-2 symbol identification information indicating each symbol configuring the switching guard time, and may also transmit to the UE 100-1 and the UE 100-2 format identification information indicating a setting format for the switching guard time.

FIG. 23 is a sequence diagram showing the switching operation from the cellular communication to the D2D communication in a case of performing the D2D communication by using the UL radio resource. In FIG. 23, a situation is supposed where the UE 100-1 and the UE 100-2 are adjacent to each other and the UE 100-1 and the UE 100-2 perform the cellular communication therebetween through a network. Further, a situation is supposed where a UE 100-3 and a UE 100-4 are located around the UE 100-1 and the UE 100-2.

As shown in FIG. 23, in step S301, each of the UE 100-1 and the UE 100-2 performs the cellular communication with the eNB 200. The eNB 200 assigns to each of the UE 100-1 and the UE 100-2 the radio resource for the cellular communication.

In step S302, the eNB 200 determines that the UE 100-1 and the UE 100-2 are switched from the cellular communication to the D2D communication.

In step S303, the eNB 200 confirms whether or not the UE 100-2 that is a reception-side UE in the D2D communication supports the simultaneous reception of cellular and D2D.

When the UE 100-2 does not support the simultaneous reception of cellular and D2D, in step S304, the eNB 200 calculate, in unit of symbol, the switching guard time on the basis of the timing advance value set to the UE 100-2. For example, the eNB 200 acquires the accumulated value of the timing advance value to determine on the basis of the accumulated value how far the UL subframe and the DL subframe overlap in the UE 100-2.

In step S305, the eNB 200 notifies, in unit of subframe, the UE 100-1 to the UE 100-4 of the switching timing from the cellular communication to the D2D communication.

In step S306, the eNB 200 notifies the UE 100-1, the UE 100-3, and the UE 100-4 of the switching guard time and the transmission timing of Discovery signal.

In step S307 to S309, each of the UE 100-1, the UE 100-3, and the UE 100-4 transmits the Discovery signal at the Discovery signal transmission timing.

In step S310, the UE 100-1 and the UE 100-2 starts the D2D communication after the switching guard time and the Discovery signal transmission timing pass.

In step S311, each of the UE 100-1 to UE 100-4 notifies the eNB 200 of a reception result of the Discovery signal.

Other Embodiments

In each of the above-described embodiments, the eNB 200 confirms whether or not the simultaneous reception of cellular and D2D or the simultaneous transmission of cellular and D2D is supported. However, when the simultaneous reception of cellular and D2D or the simultaneous transmission of cellular and D2D transmission is performed, a communication quality may deteriorate due to interference. Thus, the eNB 200 may set the switching guard time on the basis of the timing advance value without confirming whether or not the simultaneous reception of cellular and D2D or the simultaneous transmission of cellular and D2D is supported.

In each of the above-described embodiments, the switching guard time is calculated and notified, for example, in the eNB 200; however, the switching guard time may be calculated and notified, for example, in the UE 100-1 or the UE 100-2.

In the above-described each embodiment, the LTE system as one example of a cellular system is described; however, the present invention is not limited to the LTE system, and the present invention may be applied to a communication system other than the LTE system.

In addition, the entire content of Japanese Patent Application No. 2013-135605 (filed on Jun. 27, 2013) is incorporated in the present specification by reference.

INDUSTRIAL APPLICABILITY

The present invention is useful in a mobile communication filed.

The invention claimed is:

1. A user terminal, comprising:
a controller including a processor;
a memory communicatively coupled to the processor; and
a transmitter, wherein
the controller is configured to control performing Device to Device (D2D) communication, that is direct device-to-device communication, by use of a frame structure defined for uplink communication and downlink communication;
the transmitter is configured to transmit, to a base station, first information indicating whether the user terminal supports simultaneous transmission of the uplink communication and the D2D communication;
the receiver is configured to receive, from the base station, second information indicating radio resources to be used for the user terminal to perform a transmission of the D2D communication; and
the transmitter is further configured to transmit, to the base station, third information indicating that the user terminal supports simultaneous reception of the downlink communication and the D2D communication.

2. A user terminal, comprising:
a controller configured to control performing Device to Device (D2D) communication, that is direct device-to-device communication, by use of a frame structure defined for uplink communication and downlink communication; and
a transmitter configured to transmit to a base station, first information indicating whether the user terminal supports simultaneous transmission of the uplink communication and the D2D communication, wherein
the transmitter is further configured to transmit, to the base station, second information indicating that the user terminal supports simultaneous reception of the downlink communication and the D2D communication.

* * * * *